(12) United States Patent
Lee et al.

(10) Patent No.: US 8,302,829 B2
(45) Date of Patent: Nov. 6, 2012

(54) BICYCLE CARRIER FOR VEHICLE

(75) Inventors: Seung Mok Lee, Gunpo-si (KR); Hee Chan Yang, Hwaseong-si (KR); Dong Eun Cha, Seongnam-si (KR); Nam Cheol Kim, Suwon-si (KR); Kwang Jae Choi, Hwaseong-si (KR); Ju Yong Park, Cheongju-si (KR); Jo Han Kim, Hwaseong-si (KR); Yong Won Jeong, Hwaseong-si (KR); Kwang Sup Jeong, Suwon-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 379 days.

(21) Appl. No.: 12/778,799

(22) Filed: May 12, 2010

(65) Prior Publication Data

US 2011/0108592 A1    May 12, 2011

(30) Foreign Application Priority Data

Nov. 6, 2009    (KR) ......................... 10-2009-0107021

(51) Int. Cl.
  *B60R 9/00*    (2006.01)
  *B60R 9/10*    (2006.01)
(52) U.S. Cl. ........ 224/489; 224/488; 224/491; 224/495; 224/497; 224/502; 224/504; 224/507; 224/924

(58) Field of Classification Search .................. 224/488, 224/489, 491, 495–499, 502, 504–505, 507, 224/509, 512, 514, 517–519, 521, 924
See application file for complete search history.

(56) References Cited

U.S. PATENT DOCUMENTS

| | | | |
|---|---|---|---|
| 6,575,509 B1 * | 6/2003 | Golden | 293/119 |
| 2007/0102465 A1 * | 5/2007 | Wezyk et al. | 224/321 |
| 2008/0006667 A1 * | 1/2008 | Bergerhoff et al. | 224/533 |

* cited by examiner

*Primary Examiner* — Justin Larson
*Assistant Examiner* — Adam Waggenspack
(74) *Attorney, Agent, or Firm* — Morgan, Lewis & Bockius LLP

(57) ABSTRACT

Disclosed herein is a bicycle carrier for a vehicle, which is housed in the rear bumper of the vehicle to be concealed and when necessary is drawn out from the rear bumper to carry a bicycle. The bicycle carrier includes a front frame positioned in a rear bumper of the vehicle and secured to a rear end of a vehicle body. A central frame perpendicularly passes through the front frame. A rear frame is secured to a rear end of the central frame. A folding unit couples each of opposite ends of the front frame with each of opposite ends of the rear frame and is folded to vary a distance between the front frame and the rear frame. A bicycle wheel support is provided on the folding unit. A bicycle body support is provided on the central frame.

19 Claims, 25 Drawing Sheets

BICYCLE CARRIER FOR VEHICLE

CROSS-REFERENCE TO RELATED APPLICATIONS

The present application claims priority to Korean Patent Application Number 10-2009-0107021 filed on Nov. 6, 2009, the entire contents of which application is incorporated herein for all purpose by this reference.

BACKGROUND OF THE INVENTION

1. Field of the Invention

The present invention relates to a bicycle carrier for a vehicle, which is housed in the rear bumper of the vehicle to be concealed and when necessary is drawn out from the rear bumper to carry a bicycle.

2. Description of Related Art

Today, bicycles are being used as means of leisure as well as transportation means. When the bicycle is used as a means of leisure, a biker carries the bicycle to a place, such as a river having a bicycle path which is well maintained or a mountain having a mountain bicycle course, prior to riding on the bicycle.

In order to carry the bicycle with the vehicle, bicycle carriers for vehicles have been developed. Bicycle carriers typically include a roof bicycle carrier which is installed to the roof rack of the vehicle, and a rear bicycle carrier which is installed to the rear of the vehicle. The rear bicycle carrier is usually installed to the trunk or tail gate of the vehicle. Recently, a bicycle carrier which is installed to the drawbar hook of the vehicle has been proposed.

However, conventional bicycle carriers for vehicles require additional installation to the vehicles and have the following problems.

The roof bicycle carrier is problematic in that the bicycle must be lifted up to the roof of the vehicle to be loaded onto the carrier, thus inconveniencing a user. When the vehicle loaded with the bicycle is driven, the height of the vehicle increases, and the center of gravity of the vehicle becomes elevated, thus hindering the safe driving of the vehicle.

Meanwhile, the rear bicycle carrier overcomes the problems occurring in the roof bicycle carrier, because the bicycle is loaded onto the rear of the vehicle. However, the rear bicycle carrier is problematic in that it protrudes rearwards from the vehicle even when the vehicle is driven without loading the bicycle, so that the substantial length of the vehicle increases, thus inconveniencing a driver. Further, in order to overcome such an inconvenience when the vehicle is driven during normal times, the bicycle carrier may be detached from the vehicle and stored in the trunk or the like when it is not necessary to load the bicycle onto the vehicle. However, this is also problematic in that the bicycle carrier must be repeatedly attached to and detached from the vehicle, thus inconveniencing a user.

Further, the rear bicycle carrier is problematic in that, when the bicycle is loaded onto the carrier, the license plate of a vehicle is hidden, so that it may violate traffic regulations. The rear bicycle carrier and the bicycle loaded onto the carrier cover the taillight of the vehicle, so that information displayed by the taillight may not be cleanly transmitted to a trailing vehicle, thus causing a traffic accident. Further, in the case of loading the bicycle, it is impossible to open the trunk or tail gate of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a bicycle carrier for a vehicle, which is housed in the rear bumper of the vehicle to be concealed when a bicycle is not loaded, and is drawn rearwards from the vehicle when the bicycle is to be loaded.

Further, the present invention is directed to provide a bicycle carrier for a vehicle, which is tilted downwards to allow the trunk or tail gate of the vehicle to open even when the bicycle is loaded onto the rear of the vehicle.

Furthermore, the present invention is directed to provide a bicycle carrier for a vehicle, which has a subsidiary license plate mounting unit to allow the number of the vehicle to be distinguished from behind the vehicle even when the bicycle is loaded onto the rear of the vehicle.

Further, the present invention is directed to provide a bicycle carrier for a vehicle, which has a subsidiary lamp unit which allows information displayed by the tail light of the vehicle to be unobstructedly transmitted to a trailing vehicle even when a bicycle is loaded onto the rear of the vehicle.

According to an aspect of the present invention, the bicycle carrier for a vehicle provided on the vehicle to load a bicycle to an outside of the vehicle, the bicycle carrier may include a front frame positioned in a rear bumper of the vehicle, and secured to a vehicle body; a central frame passing through the front frame and the vehicle body; a rear frame secured to a rear end of the central frame to be selectively drawn out of the rear bumper of the vehicle; a folding unit pivotally coupling each of opposite ends of the front frame with each of opposite ends of the rear frame, and selectively folded to vary a distance between the front frame and the rear frame while the rear frame moves; a bicycle wheel support pivotally coupled to the folding unit, thus supporting a wheel of the bicycle loaded onto the bicycle carrier; and a bicycle body support pivotally provided on the central frame, thus supporting a body of the bicycle loaded onto the bicycle carrier, wherein an extensible bumper is provided on the rear frame to form a part of an appearance of the rear bumper and be separated from the rear bumper when the rear frame is drawn out of the rear bumper, so that the central frame, the rear frame and the folding unit are housed in the rear bumper to be concealed, and are drawn out from the rear bumper when necessary.

The central frame may have a space therein and opens at an upper portion thereof so that the bicycle body support is rotatably received in the central frame to be housed therein.

An elastic member may be provided on a front end of the central frame, and a restraint unit is provided on the front frame so that the central frame is restrained by the restraint unit while pressing the elastic member, when the central frame, the rear frame and the folding unit are housed in the rear bumper of the vehicle.

The restraint unit may include a housing provided on the front frame; a elastic member provided in the housing; and a restraining protrusion protruding to an outside of the housing by an elastic force of the elastic member and being selectively coupled to a hole of the central frame to restrain a movement of the central frame.

A subsidiary license plate mounting unit may be provided on the rear frame to attach a subsidiary license plate, and includes, a license plate mount to which the subsidiary license plate is attached thereon; and a rotary clamp holding the license plate mount so that the license plate mount is rotated with respect to the rear frame, thus allowing the license plate mount to be positioned outside or inside the extensible bumper.

The rotary clamp may include a support member secured to the rear frame; a rotary pin rotatably provided on the support member; and a fastening clip secured to the rotary pin and to the license plate mount.

A subsidiary lamp unit having a subsidiary tail light may be provided on the folding unit, and includes a lamp body and a coupling bar coupled to the lamp body to be fastened to the folding unit, wherein the coupling bar is foldably coupled to the lamp body, and is detachably coupled to the folding unit, and wherein a lamp receiving unit is provided on the central frame so that the subsidiary lamp unit detached from the folding unit is folded and received in the lamp receiving unit, the lamp receiving unit being positioned to be lower than the folding unit and thus the lamp receiving unit does not interfere with folding operation of the folding unit.

The front frame may include a first frame pivotally coupled to the folding unit in one rotational axis, one surface of a second frame pivotally coupled to a lower portion of the first frame in the other rotational axis via a hinge, and the other surface of the second frame secured to the vehicle body, the first frame being rotatable downwards from the second frame within a predetermined angle, wherein the one rotational axis and the other rotational axis is perpendicular.

An elastic member may be provided on a front end of the central frame, and a restraint unit is provided on the first frame to restrain the central frame, so that the central frame is restrained by the restraint unit while pressing the elastic member, when the central frame, the rear frame and the folding unit are housed in the rear bumper of the vehicle.

A pad having a guide hole may be provided on the second frame, and a guide bar is provided on the first frame and is inserted into the guide hole to reduce a rotating speed of the first frame by friction occurring between the guide bar and the pad when the first frame is rotated, wherein the guide bar has a shape of an arc so that the guide bar is in contact with an upper portion of the pad when the first frame is rotated, and is formed to have a curvature radius which is larger than a circular orbital pattern which has at a center of the hinge and contacts the upper portion of the pad, so that the guide bar continuously presses the upper portion of the pad and generates the friction when the first frame is rotated, and wherein a stopper is provided on a distal end of the guide bar to be stopped by the pad to limit a rotating angle of the first frame.

The folding unit may include at least a first link pivotally coupled to the front frame, and at least a second link pivotally coupled at a first end thereof to the at least a first link and pivotally coupled at a second end thereof to the rear frame, and wherein a link locking unit selectively locks the first link and the second link, thus preventing the folding unit from being unexpectedly folded, wherein the link locking unit includes, a housing provided on the first link; an elastic member provided in the housing; and a locking protrusion slidably coupled to the housing and elastically biased to an outside of the housing by the elastic member, wherein a locking hole is formed in a hinge formed in the first end of the second link so that a distal end of the locking protrusion is inserted into the locking hole when the first and second links are fully extended, and wherein the distal end of the locking protrusion is placed on a cam portion of the hinge when the first and second links are folded.

In another aspect of the present invention, a bicycle carrier for a vehicle may include a front frame placed in a forward direction of the vehicle and aligned along a transverse direction of the vehicle; a central frame aligned along a longitudinal direction of the vehicle and passing through the front frame; a rear frame placed in a rearward direction of the vehicle and secured to a rear end of the central frame; a folding unit disposed between the front frame and the rear frame and coupling each of opposite ends of the front frame with each of opposite ends of the rear frame, and selectively folded to vary a distance between the front frame and the rear frame; a bicycle wheel support pivotally provided on the folding unit, thus supporting a wheel of a bicycle loaded onto the bicycle carrier; and a bicycle body support pivotally provided on the central frame, thus supporting a body of the bicycle loaded onto the bicycle carrier.

The central frame may have a space therein and opens at an upper portion thereof so that the bicycle body support is rotatably received in the central frame to be housed therein, wherein the front frame includes a first frame pivotally coupled to the folding unit in one rotational axis, one surface of a second frame being pivotally coupled to a lower portion of the first frame in another rotational axis, and another surface of the second frame being secured to the vehicle body, wherein the one rotational axis and the another rotational axis are perpendicular.

In various aspect of the present invention, the bicycle carrier for a vehicle is advantageous in that the bicycle carrier is housed in a rear bumper to be concealed when a bicycle is not loaded, thus preventing the length of the vehicle from increasing when the bicycle is not loaded, and in which it is not necessary to frequently attach or detach the bicycle carrier to or from the vehicle, thus enhancing convenience.

Further, a bicycle carrier for a vehicle according to the present invention is advantageous in that it can be tilted downwards even when a bicycle is loaded onto the rear of the vehicle, thus allowing the trunk or tail gate of the vehicle to be opened even when the bicycle is loaded.

Furthermore, a bicycle carrier for a vehicle according to the present invention is advantageous in that it is provided with a subsidiary license plate mounting unit to allow a vehicle plate number to be distinguished from behind the vehicle, so that it does not violate traffic regulations.

Further, a bicycle carrier for a vehicle according to the present invention is advantageous in that it is provided with a subsidiary lamp unit, thus allowing information displayed by a tail light to be precisely transmitted to a trailing vehicle, therefore preventing vehicular accidents.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
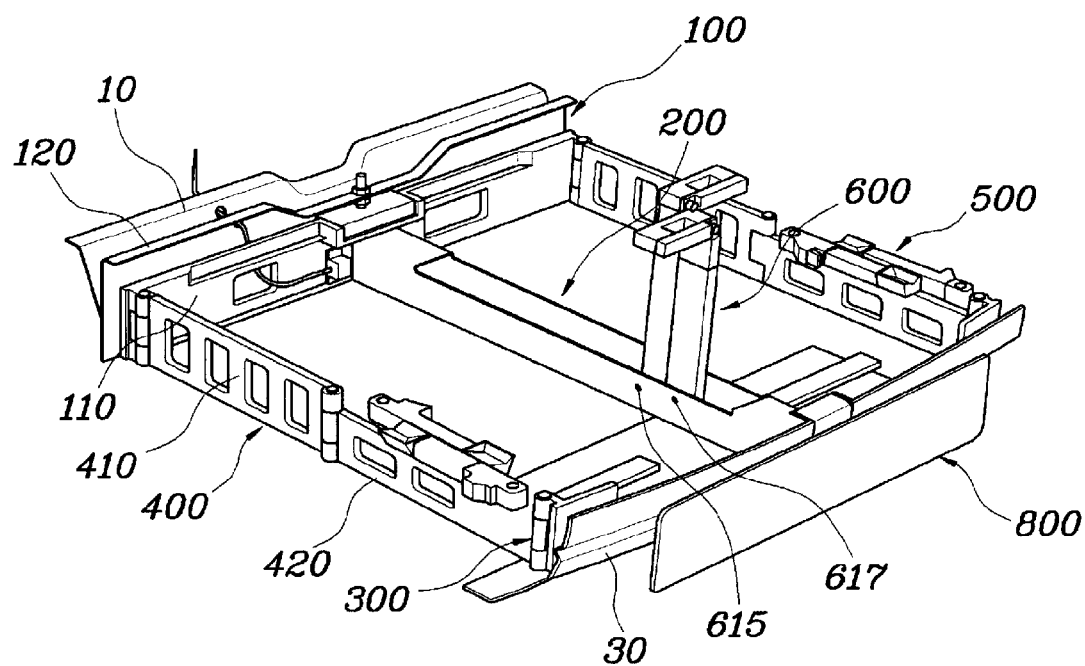
FIG. 1 is a perspective view illustrating an exemplary bicycle carrier for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIGS. 1 through 9, an exemplary bicycle carrier for a vehicle according to the present invention is installed in a rear bumper 20 of the vehicle in such a way as to be drawn out from the vehicle and allows a bicycle 2 to be loaded onto the outer portion of the vehicle 1. The bicycle carrier includes a front frame 100, a central frame 200, a rear frame 300, folding units 400, bicycle wheel supports 500, and bicycle body supports 600.

The front frame 100 is positioned in the rear bumper 20 of the vehicle 1 and mounted to the rear end of a vehicle body 10. The front frame 100 has the shape of a rectangle which is long in the transverse direction of the vehicle 1 when the front frame 100 is mounted to the vehicle body 10. Meanwhile, passing holes 121 and 125 (see FIGS. 7 and 12) is formed in the central portion of the front frame 100 so that the central frame 200 passes through the front frame 100. In particular, the passing holes 121 and 125 are formed in a first frame 110 and a second frame 120 of the front frame 100 respectively and another passing hole 127 (see FIG. 15) may be formed in a vehicle body such that the central frame 200 may communicate through the passing holes 120, 125 and 127.

The central frame 200 is installed to be perpendicular to the front frame 100, and passes through the front frame 100 in such a way as to slide in the longitudinal direction of the vehicle 1. Preferably, the central frame 200 has the shape of a rectangular beam which has a space 210 therein. The upper portion of the central frame 200 is cut so that the space 210 is exposed.

The rear frame 300 is attached to the rear end of the central frame 200, and has the shape of a rectangle which is long in the transverse direction of the vehicle 1 when the rear frame 300 is attached to the end of the central frame 200.

Meanwhile, the central portion of the rear frame 300 is attached to the end of the central frame 200 by welding. Thus, when the central frame 200 slides in the longitudinal direction of the vehicle 1, the rear frame 300 also moves along in the longitudinal direction of the vehicle 1 along with the central frame 200.

Further, an extensible bumper 30 is installed to the rear frame 300. The extensible bumper 30 forms part of the appearance of the rear bumper 20 and is separable from the rear bumper 20.

The folding units 400 are installed to couple facing ends of the front frame 100 and the rear frame 300 to each other, and are folded to vary the distance between the front frame 100 and the rear frame 300 when the central frame 200 slides. Such a folding unit 400 may be folded in various manners and comprise a plurality of links which are joined to each other in such a way as to be folded.

FIG. 1 illustrates one example of the folding unit 400. The folding unit 400 includes a first link 410 which is rotatably coupled to the front frame 100, and a second link 420 which is rotatably hinged at one end thereof to the first link 410 and rotatably coupled at the other end to the rear frame 300.

Figure 3:
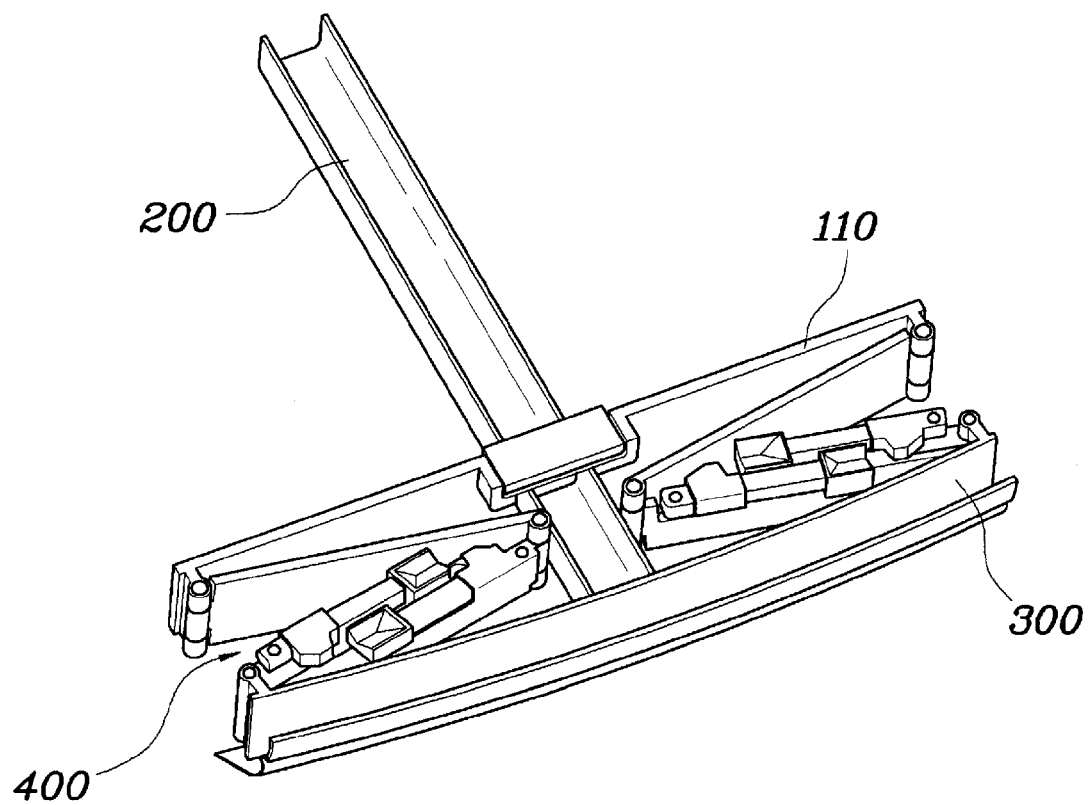
FIG. 3 is a view illustrating the folded state of the exemplary bicycle carrier according to the present invention.
Figure 4:
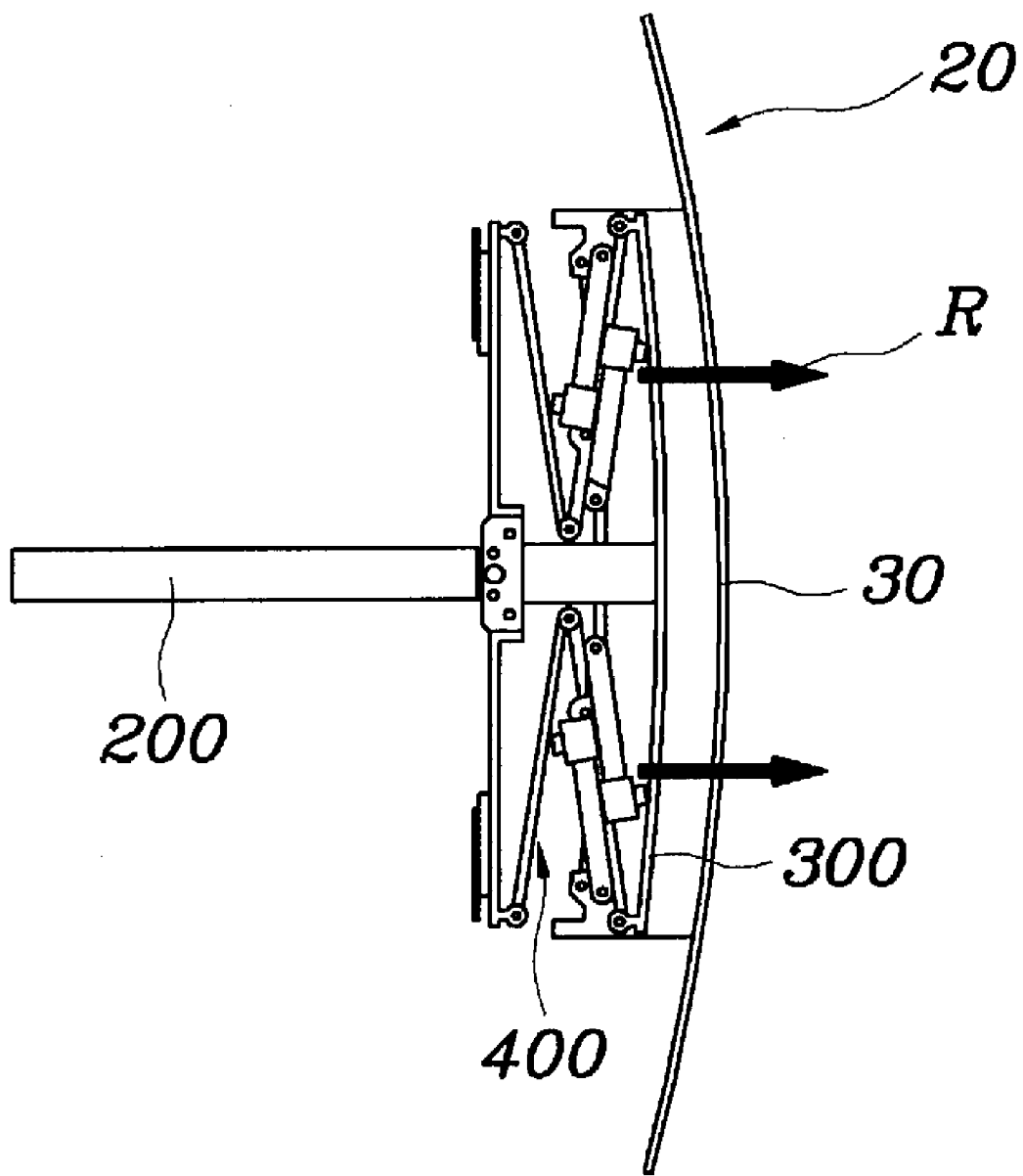
FIG. 4 is a view illustrating the state in which the exemplary bicycle carrier according to the present invention is housed in the rear bumper of the vehicle.
Figure 5:
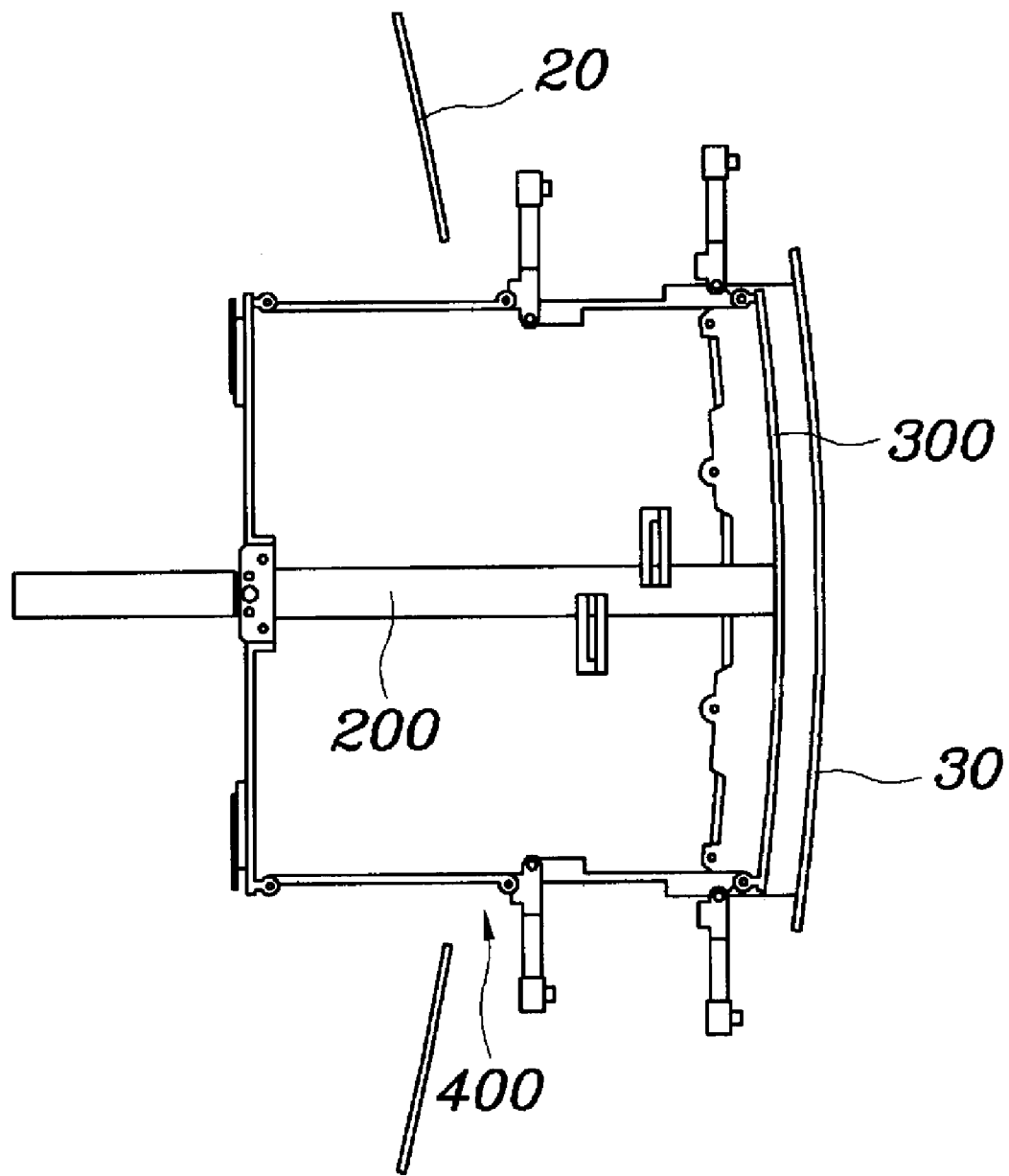
FIG. 5 is a view illustrating the state in which the exemplary bicycle carrier according to the present invention is drawn out from the vehicle.

A pair of folding units 400, each having the first link 410 and the second link 420, is installed to be spaced apart from each other by the length of the rear frame 300. The folding units 400 are folded in a direction facing each other, as shown in FIG. 3.

Figure 24:
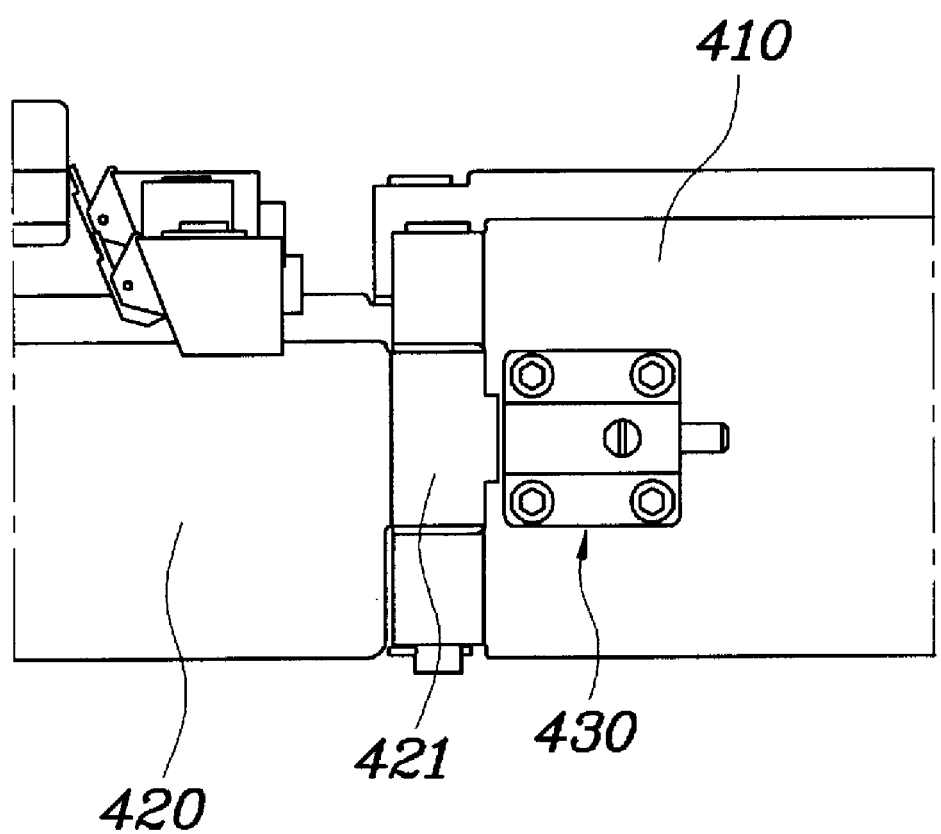
FIG. 24 is a view illustrating a link locking unit applied to the exemplary bicycle carrier according to the present invention.
Figure 25:
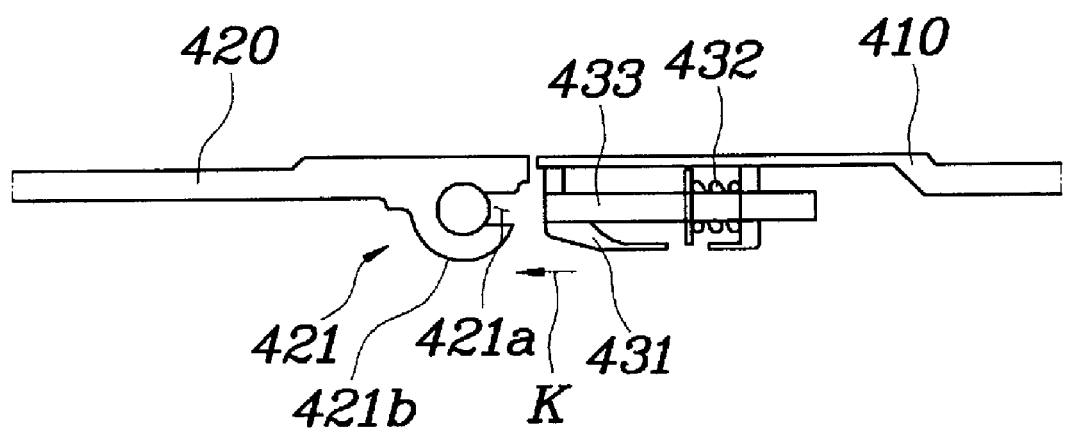
FIG. 25 is a view illustrating the operation of the link locking unit.

Meanwhile, referring to FIGS. 24 and 25, a link locking unit 430 is installed to the first link 410 of the folding unit 400 and locks the second link 420 to prevent the folding unit 400 from unexpectedly folding. The link locking unit 430 includes a housing 431 which is installed to the first link 410, a spring 432 which is installed in the housing 431, and a locking protrusion 433 which protrudes to the outside of the housing 431 by the elastic force of the spring 432 to lock the second link 420.

A locking hole 421a is formed in a hinge portion 421 of the second link 420 so that the locking protrusion 433 is inserted into the locking hole 421a.

The operation of the link locking unit 430 will be described below.

When the folding unit 400 is extended, the locking protrusion 433 is moved in a direction shown by arrow K by the elastic force of the spring 432, and is inserted into the locking hole 421a which is formed in the hinge portion 421 of the second link 420, thus locking the second link 420.

Thus, the folding unit 400 can be kept extended. Meanwhile, when it is required to fold the folding unit 400, a lever (not shown) which may be connected to the locking protrusion 433 is manipulated, so that the locking protrusion 433 is pulled in a direction opposite to that shown by arrow K. In this case, the first link 410 and the second link 420 may be rotated freely, thus allowing the folding unit 400 to be folded.

Meanwhile, while the first link 410 and the second link 420 are folded, the locking protrusion 433 presses the cam surface 421b of the hinge portion 421 of the second link 420 using the elastic force of the spring 432. When the folding unit 400 is converted into an extended state again, the locking protrusion 433 pressing the cam surface 421b of the hinge portion 421 of the second link 420 is automatically inserted into the locking hole 421a, thus locking the second link 420.

Figure 2:
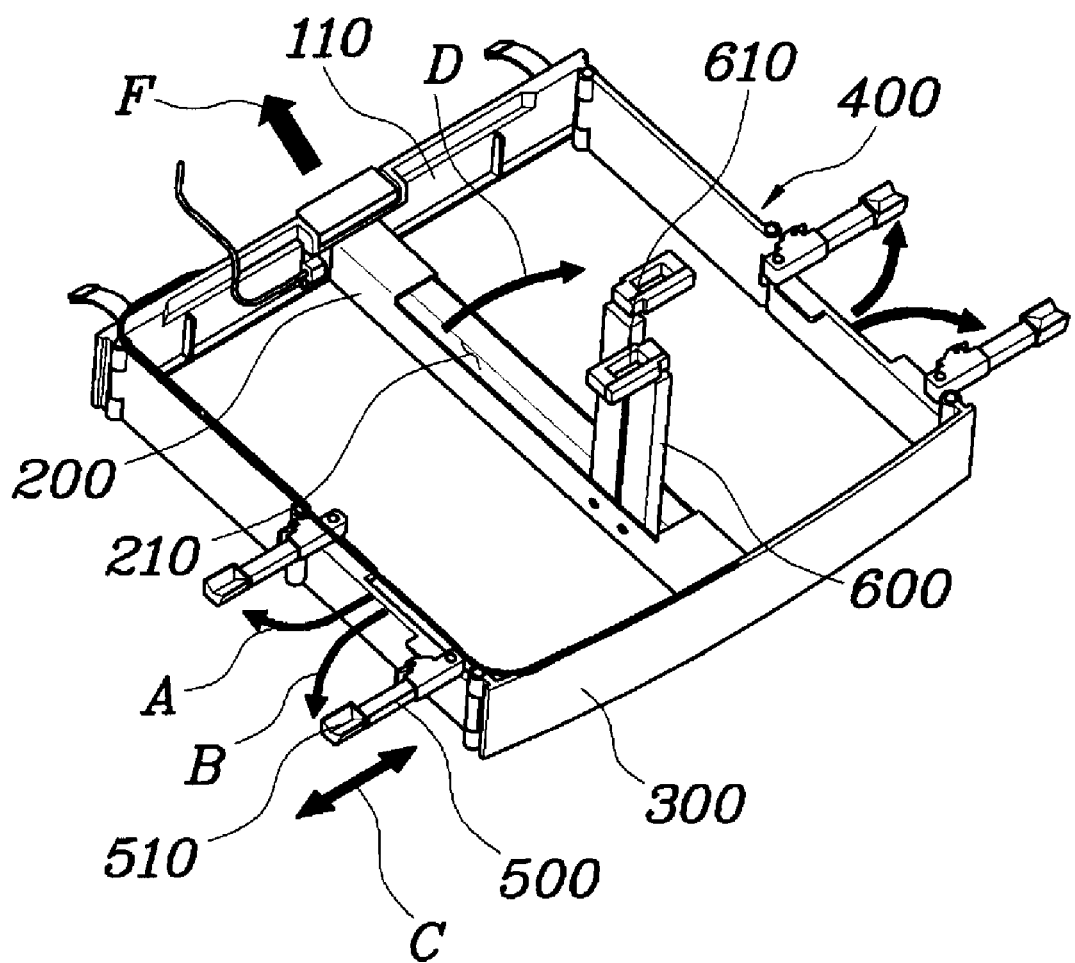
FIG. 2 is a view illustrating the operation of an exemplary bicycle wheel support and a bicycle body support applied to the bicycle carrier according to the present invention.

Referring to FIGS. 1 and 2, a pair of bicycle wheel supports 500 is installed to the upper portion of the second link 420 to be rotated in opposite directions. When the bicycle 2 is not loaded, that is, the folding unit 400 is folded, as shown in FIG. 1, the bicycle wheel supports 500 are folded in such a way as to be parallel to the second link 420. Meanwhile, when a user desires to load a bicycle 2, as shown in FIG. 2, the bicycle wheel supports 500 are rotated in opposite directions to be perpendicular to the second link 420.

Here, what is meant by saying "rotating in opposite directions" is that the bicycle wheel support 500 installed to the central portion of the folding unit 400 rotates in the direction shown by arrow A and the bicycle wheel support 500 installed to a position adjacent to the rear frame 300 rotates in the direction shown by arrow B.

Figure 9:
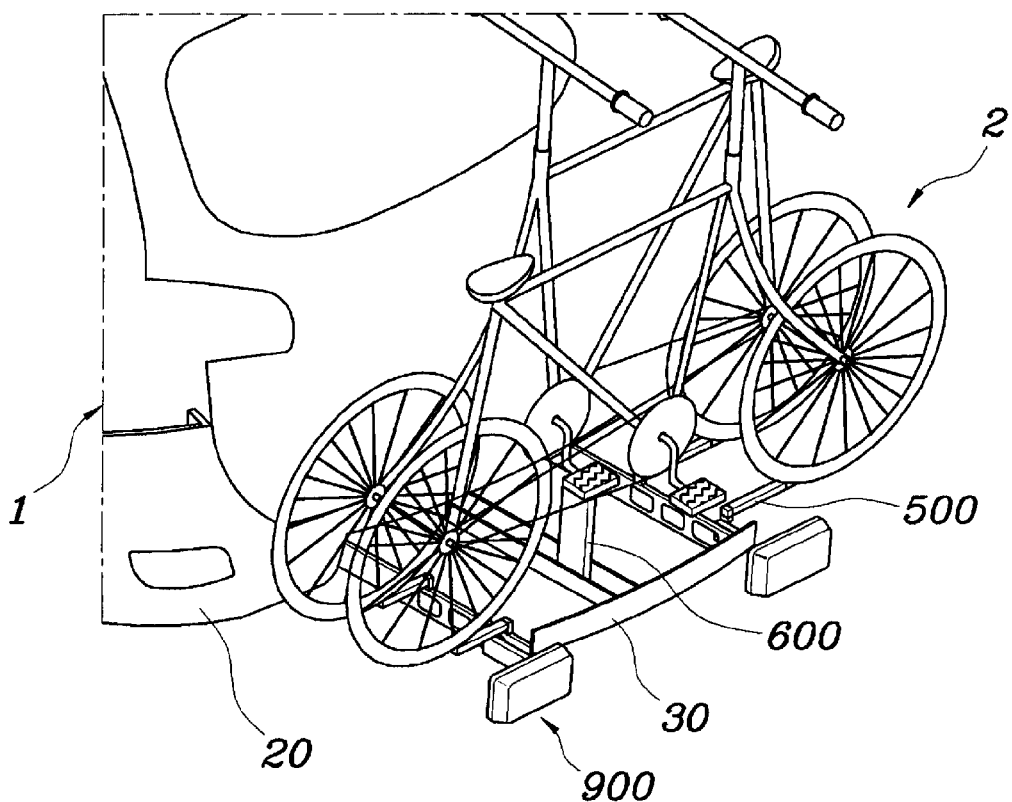
FIG. 9 is a view illustrating the state in which bicycles are loaded onto the exemplary bicycle carrier according to the present invention.

Referring to FIGS. 2 and 9, a wheel support portion 510 having a curved groove is installed to an end of each bicycle wheel support 500 to support the wheel of the bicycle 2. The bicycle wheel support 500 is variable in length such that the wheel support portion 510 moves horizontally in the direction shown by arrow C according to the size of the bicycle 2 which is loaded. A Velcro-type fastening member may be provided on the bicycle wheel support 500 to fasten the wheel of the bicycle.

Preferably, the length variable structure of the wheel support portion 510 adopts a sliding structure for fine length adjustment and a simple structure. Since the length variable structure which adopts the sliding manner and the Velcro-type fastening member are commonly used in the technical field of the present invention, a detailed description thereof will be omitted.

Referring to FIGS. 2 and 9, each bicycle body support 600 functions to support the body of the bicycle which is loaded. A pair of bicycle body supports 600 is installed to the central frame 200 in such a way as to be rotated perpendicularly. When it is not necessary to load the bicycle 2, that is, the central frame 200 slides in a front direction F of the vehicle, each bicycle body support 600 is folded in a direction opposite to that shown by direction D and positioned in the space 210 which is defined in the central frame 200. On the contrary, when it is required to load the bicycle 2, each bicycle body support 600 is rotated to be perpendicular to the central frame 200 and secured at the rotated position.

In an exemplary embodiment of the present invention, the pair of bicycle body supports 600 may be rotatably connected to the central frame 200 by pins 615 and 617 respectively. The pins 615 and 617 are spaced with a predetermined distance in a vertical direction to a longitudinal axis of the central frame 200 such that the pair of bicycle body supports 600 can rotate with interference therebetween.

Further, a frame support portion 610 is installed at an end of the bicycle body support 600 in such a way as to be rotated in a perpendicular direction and functions to support the body of the bicycle 2. Here, the frame support portion 610 is formed to support the body of the bicycle 2. However, without being limited thereto, the frame support portion 610 may be formed to support pedals.

Further, a Velcro-type fastening member or a fastening member made of an elastic rubber material may be applied to the frame support portion 610 so as to support the body of the bicycle 2. Since the fastening member has been generally used in the technical field of the present invention, a detailed description will be omitted.

Referring to FIGS. 2, 4, 5, and 9, when it is not required to load the bicycle onto the bicycle carrier according to the exemplary embodiment of the present invention constructed as described above, so that the rear frame 300 is pushed in the front direction F of the vehicle 1, the central frame 200 passes through the front frame 100 and slides in the front direction F of the vehicle 1. The folding units 400 are folded in facing directions, so that the central frame 200, the rear frame 300, and the folding units 400 are housed in the rear bumper 20 of the vehicle 1 in such a way as to be concealed. When the rear frame 300 is pulled, the central frame 200 slides in a rear direction of the vehicle, and the folding units 400 are unfolded, so that the central frame 200, the rear frame 300, and the folding units 400 are drawn out from the rear bumper 20 of the vehicle 1.

Figure 6:
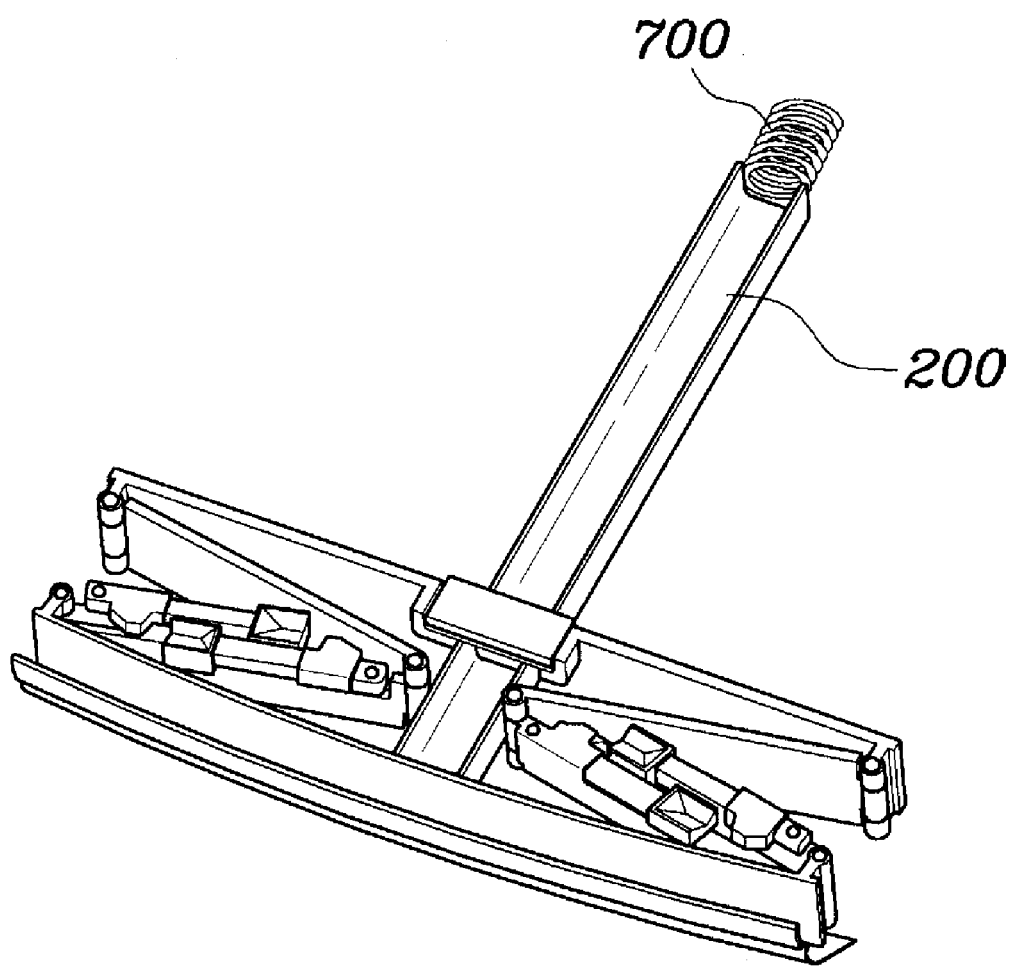
FIG. 6 is a view illustrating an elastic member which is applied to automatically draw out the exemplary bicycle carrier according to the present invention.

Meanwhile, referring to FIG. 6, an elastic member 700 may be connected to the front end of the central frame 200. However, the elastic member 700 may be installed at any position, as long as it may be pressed by the front end of the central frame 200 which slidably passes through the front frame and the vehicle body 10 equipped with the front frame 100.

Figure 7:
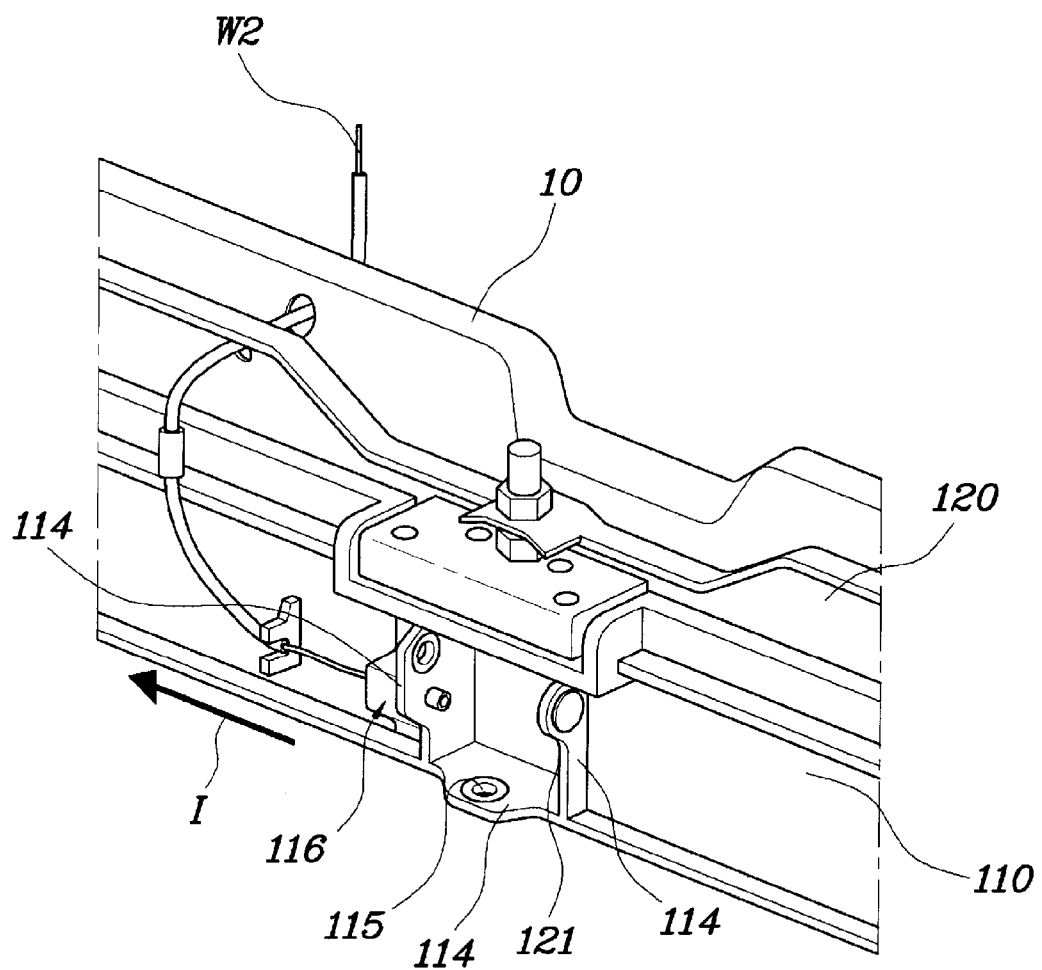
FIG. 7 is a view illustrating ball bearings for guiding the sliding motion of a central frame and a restraint unit for limiting the sliding motion of the central frame.
Figure 8:
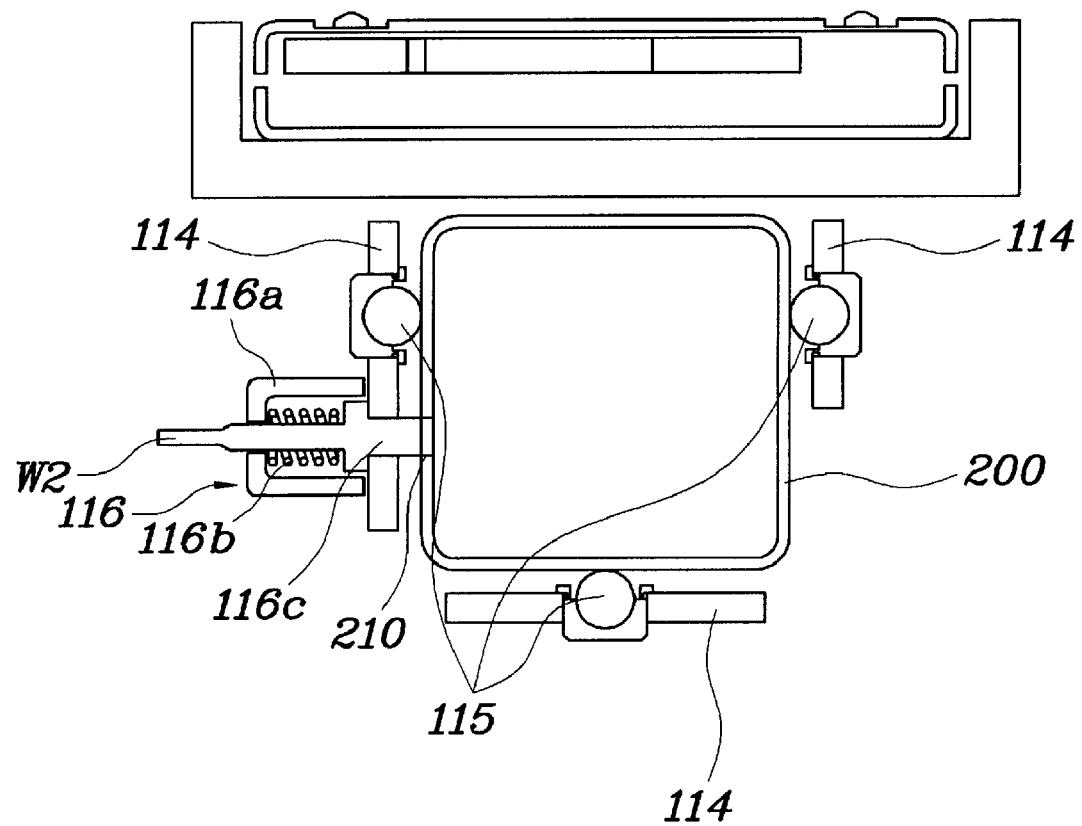
FIG. 8 is a view illustrating the operation of the ball bearing and the restraint unit.

Further, referring to FIGS. 7 and 8, ball bearings 115 may be installed to a first frame 110 to guide the sliding motion of the central frame 200. The ball bearings 115 are installed in protruding pieces 114 around the passing hole 121 formed in the front frame 100 which allows the central frame 200 to pass through the front frame 100, and rotatably contact both side surfaces and the lower surface of the central frame 200, thus enabling the central frame 200 to smoothly slide.

Further, a restraint unit 116 may be installed to the front frame 100 to limit the sliding motion of the central frame 200.

As shown in FIG. 8, the restraint unit 116 includes a housing 116a, a spring 116b, and a restraining protrusion 116c. The housing 116a is installed at any one of the protruding pieces 114. The spring 116b is installed in the housing 116a. The restraining protrusion 116c is protruded to the outside of the housing 116a by the elastic force of the spring 116b and is inserted into a hole 210 which is formed in the central frame 200, thus limiting the movement of the central frame 200.

By additionally installing the elastic member 700, the restraint unit 116 and the ball bearings 115, when the central frame 200, the rear frame 300, and the folding units 400 are housed in the lower portion of the rear of the vehicle, the central frame 200 is restrained by the restraint unit 116 while pressing the elastic member 700, as shown in FIG. 8. When the central frame 200, the rear frame 300, and the folding units 400 are drawn out, a wire W2 is pulled in a direction shown by arrow I by manipulating a lever (not shown), as shown in FIG. 7. At this time, the restraining protrusion 116c is removed from the hole 210 formed in the central frame 200, and the pressed elastic member 700 pushes the central frame 200 in the rear direction of the vehicle 1. Each folding unit 400 which is housed while being folded is unfolded by the movement of the rear frame 200 which is coupled to the central frame 200.

Thus, the central frame 200, the rear frame 300, and the folding units 400 can be automatically drawn out. Here, the central frame 200 may be smoothly slid by the ball bearings 115.

Figure 10:
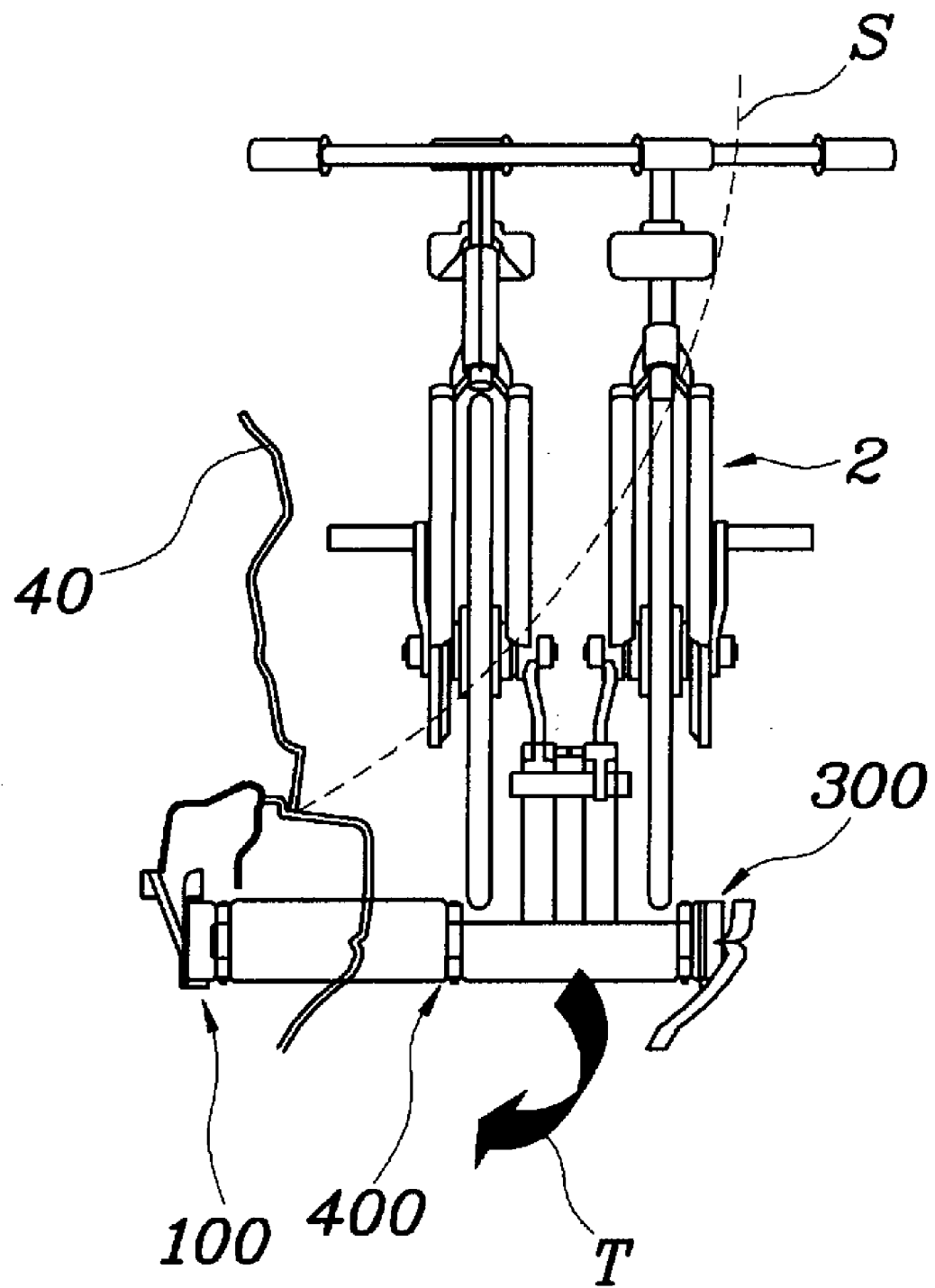
FIG. 10 is a view illustrating the downward tilting of the exemplary bicycle carrier according to the present invention.

Meanwhile, referring to FIG. 10, in the case of loading the bicycle 2 onto the bicycle carrier according to an exemplary embodiment of the present invention, the bicycle 2 loaded onto the carrier is positioned in the moving section S of the trunk or the tail gate 40 of the vehicle 1, so that there is a possibility that the trunk or tail gate 40 cannot open.

In order to solve the problem, a bicycle carrier for a vehicle according to another exemplary embodiment of the present invention has been proposed. The bicycle carrier is tilted in a downward direction T to allow the trunk or tail gate of the vehicle to open even when the bicycle is loaded.

Figure 11:
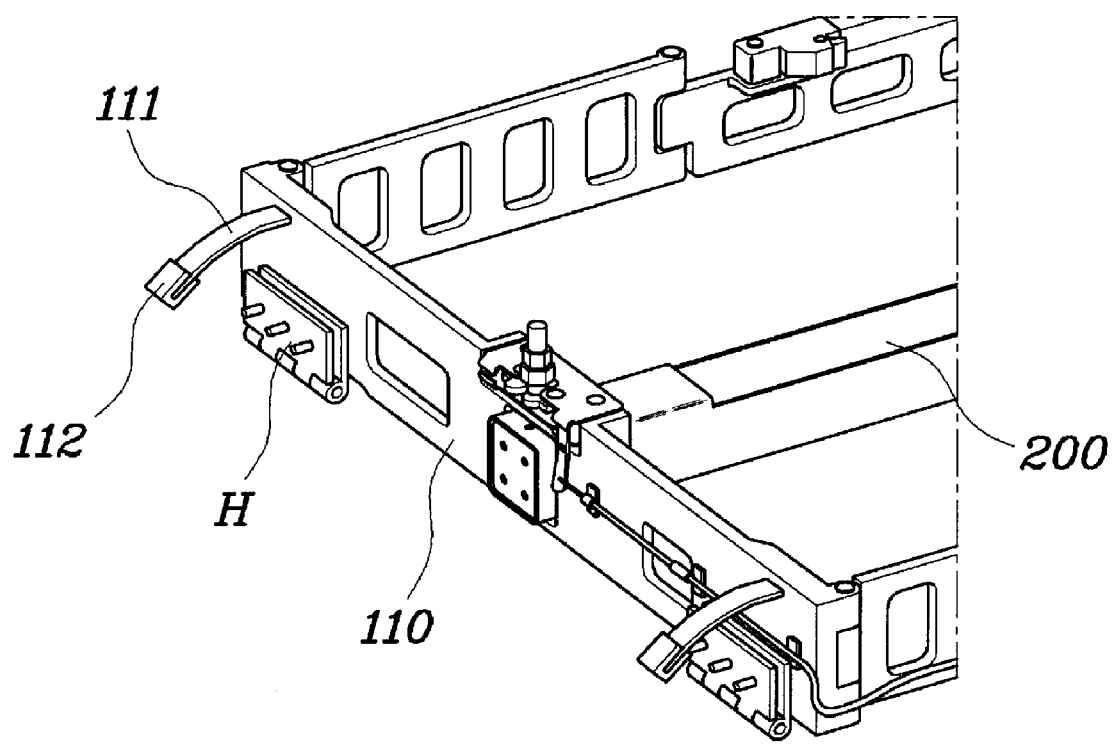
FIG. 11 is a view illustrating a first frame constituting a front frame.
Figure 12:
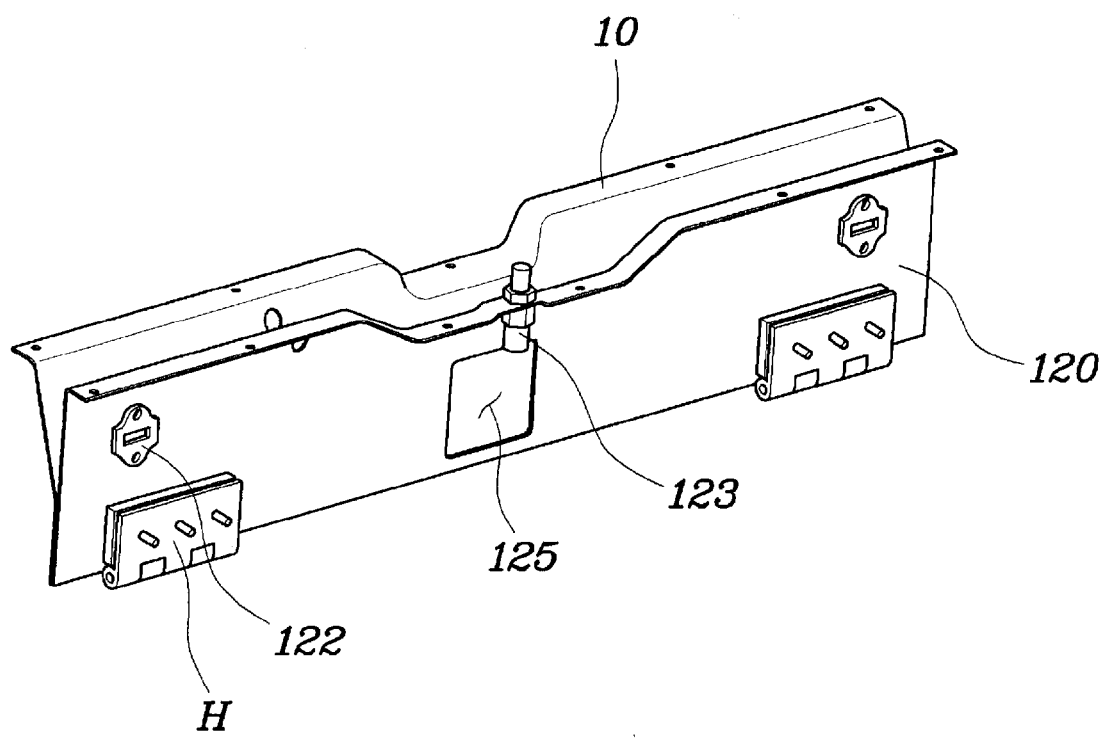
FIG. 12 is a view illustrating a second frame constituting the front frame.

Referring to FIGS. 11 and 12, according to another exemplary embodiment of the present invention, the front frame 100 includes a first frame 110 and a second frame 120 to be tilted in the downward direction T. The first frame 110 is coupled to the folding units 400. The second frame 120 is hinged to the lower portion of the first frame 110 via hinges H and secured to the vehicle body 10.

Figure 14:
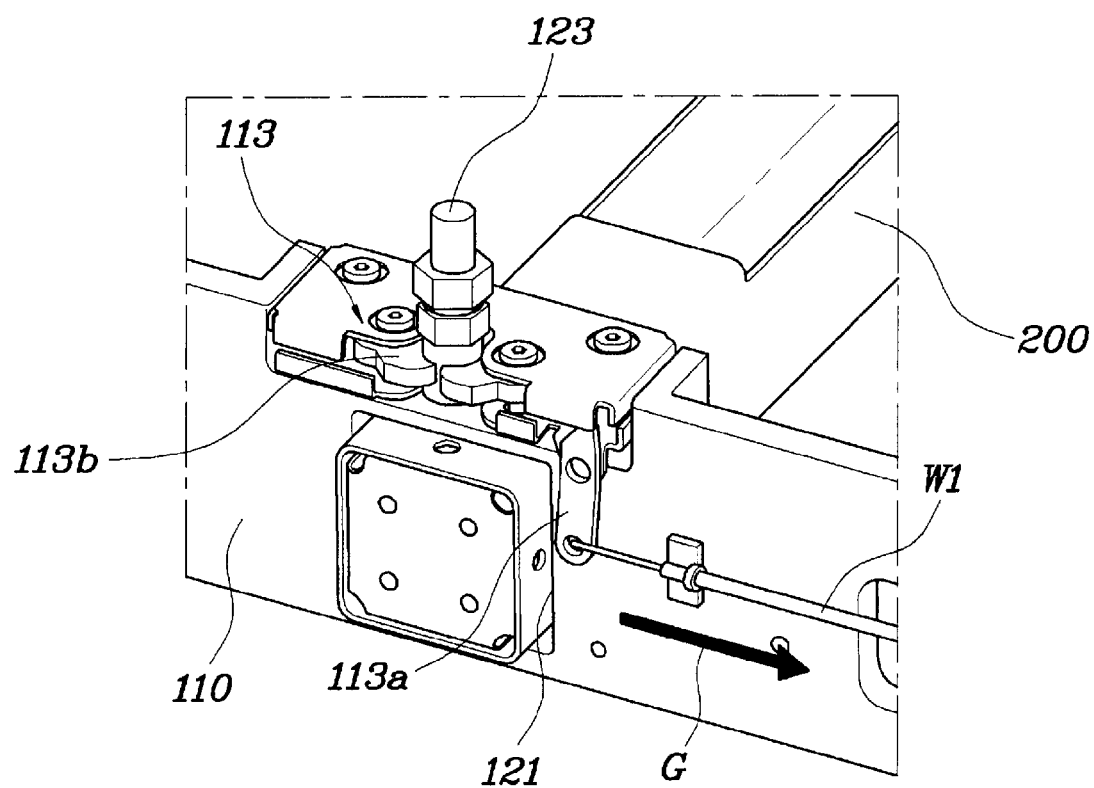
FIG. 14 is a view illustrating the coupling structure of the first frame with the second frame.

Here, a locking pin 123 is provided on the upper portion of the central portion of the second frame 120 to lock the second frame 120 to the first frame 110. A locking unit 113 is provided on the upper portion of the central portion of the first frame 110 to lock or release the locking pin 123, as shown in FIG. 14.

A pair of holders 113b is provided on the locking unit 113 to restrain left and right sides of the locking pin 123 or release the locking pin 123. A release rod 113a is installed to open the holders 113b in opposite directions, thus releasing the locking pin 123 from the holders 113b. The release rod 113a is coupled to a wire W1. The wire W1 is coupled to a lever (not shown) which may be additionally installed.

Thus, when the lever (not shown) is manipulated to tilt the bicycle carrier according to another embodiment of the present invention, the wire W1 is pulled in a direction shown by arrow G, and the holders 113b are opened in opposite directions by the operation of the release rod 113a coupled to the wire W1. Thereby, the locking pin 123 is released from the holders 113b, so that the first frame 110 can be rotated downwards from the second frame 120 at a predetermined angle.

Figure 13:
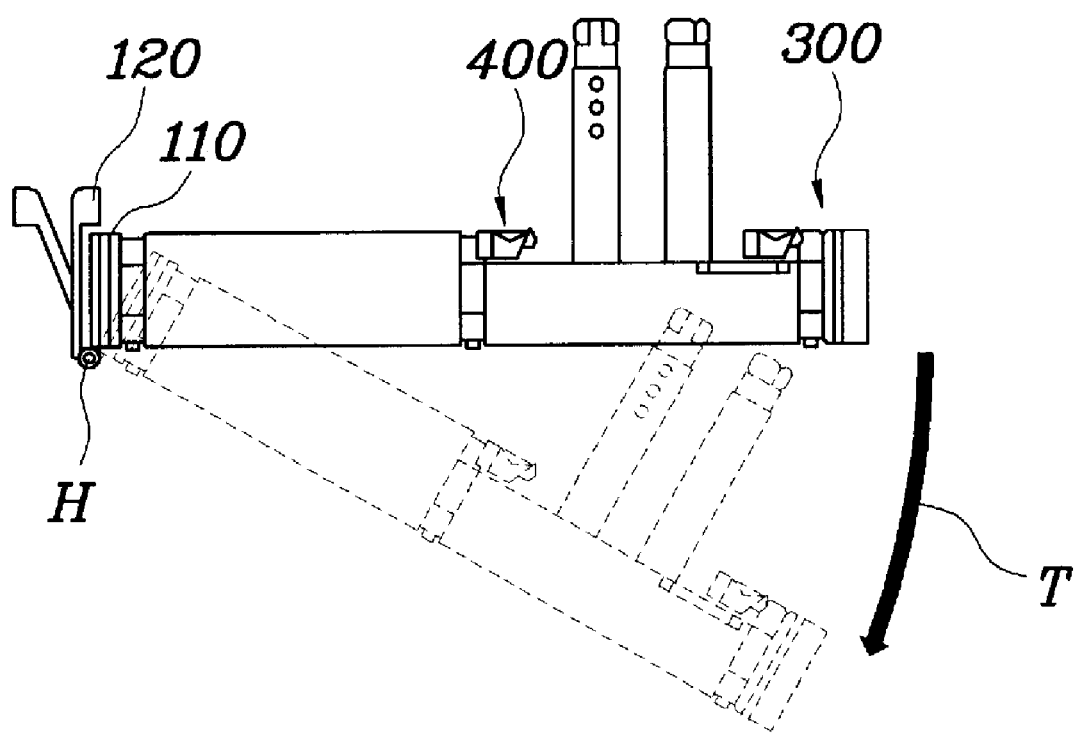
FIG. 13 is a view illustrating the state in which the first frame is rotated downwards from the second frame.

Consequently, as shown in FIG. 13, the first frame 110, the folding units 400 which are directly or indirectly coupled to the first frame 110, the rear frame 300, and the central frame 200 can be integrally tilted in the downward direction T.

Figure 15:
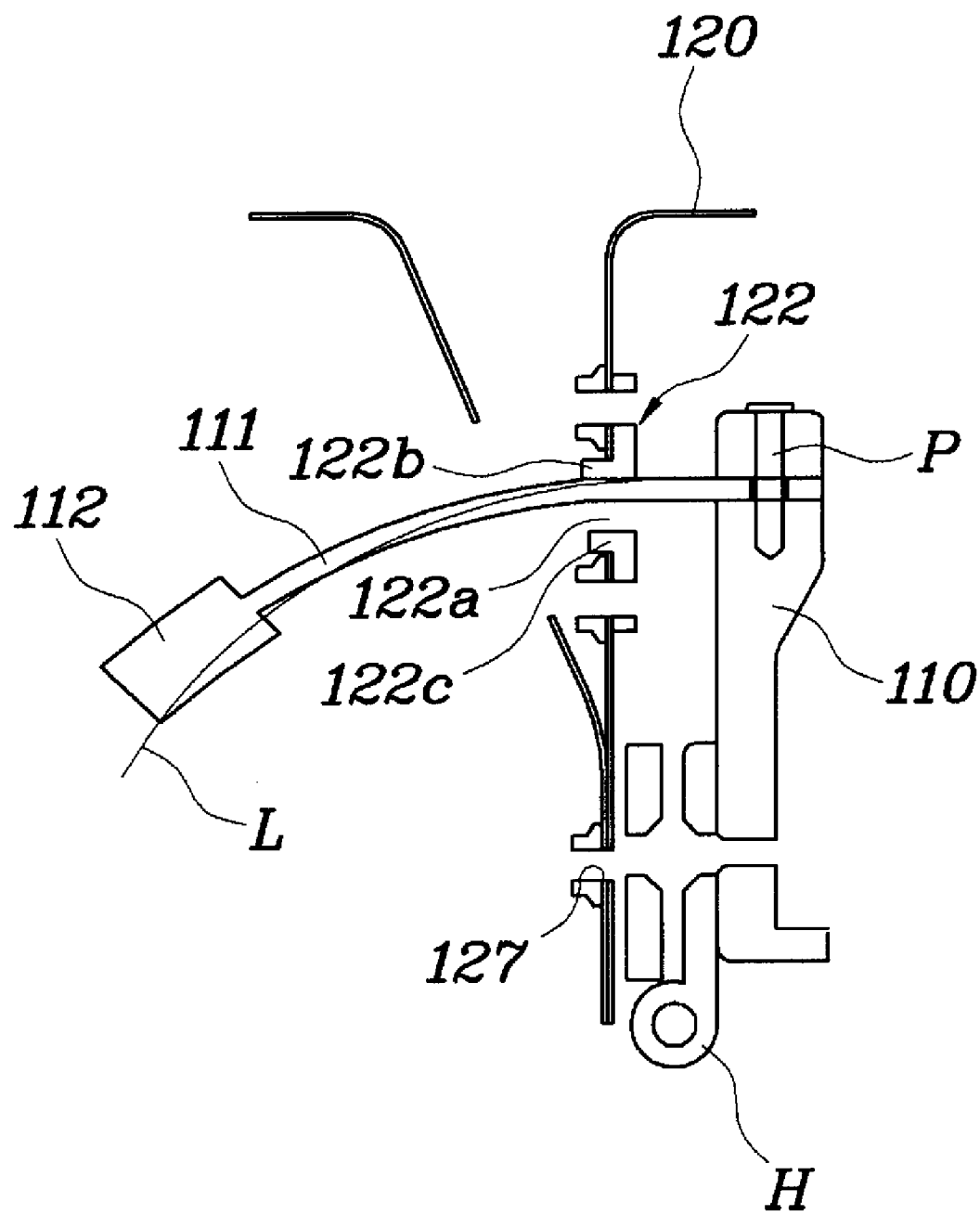
FIG. 15 is a view illustrating the state before the first frame is rotated downwards from the second frame.

Meanwhile, FIG. 15 is a view illustrating the state before the first frame 110 is rotated downwards from the second frame 120. Referring to FIGS. 11, 12 and 15, a pad 122 having a guide hole 122a is installed to the second frame 120. The pad 122 is divided into an upper part 122b and a lower part 122c with reference to the guide hole 122a.

A guide bar 111 is installed to the first frame 110 via a locking pin P and is inserted into the guide hole 122a to reduce the rotating speed of the first frame 110 by friction between the guide bar 111 and the pad 122 when the first frame 110 is rotated. A stopper 112 is installed at an end of the guide bar 111 and stopped by the pad 122 to limit the rotating angle of the first frame 110.

Figure 16:
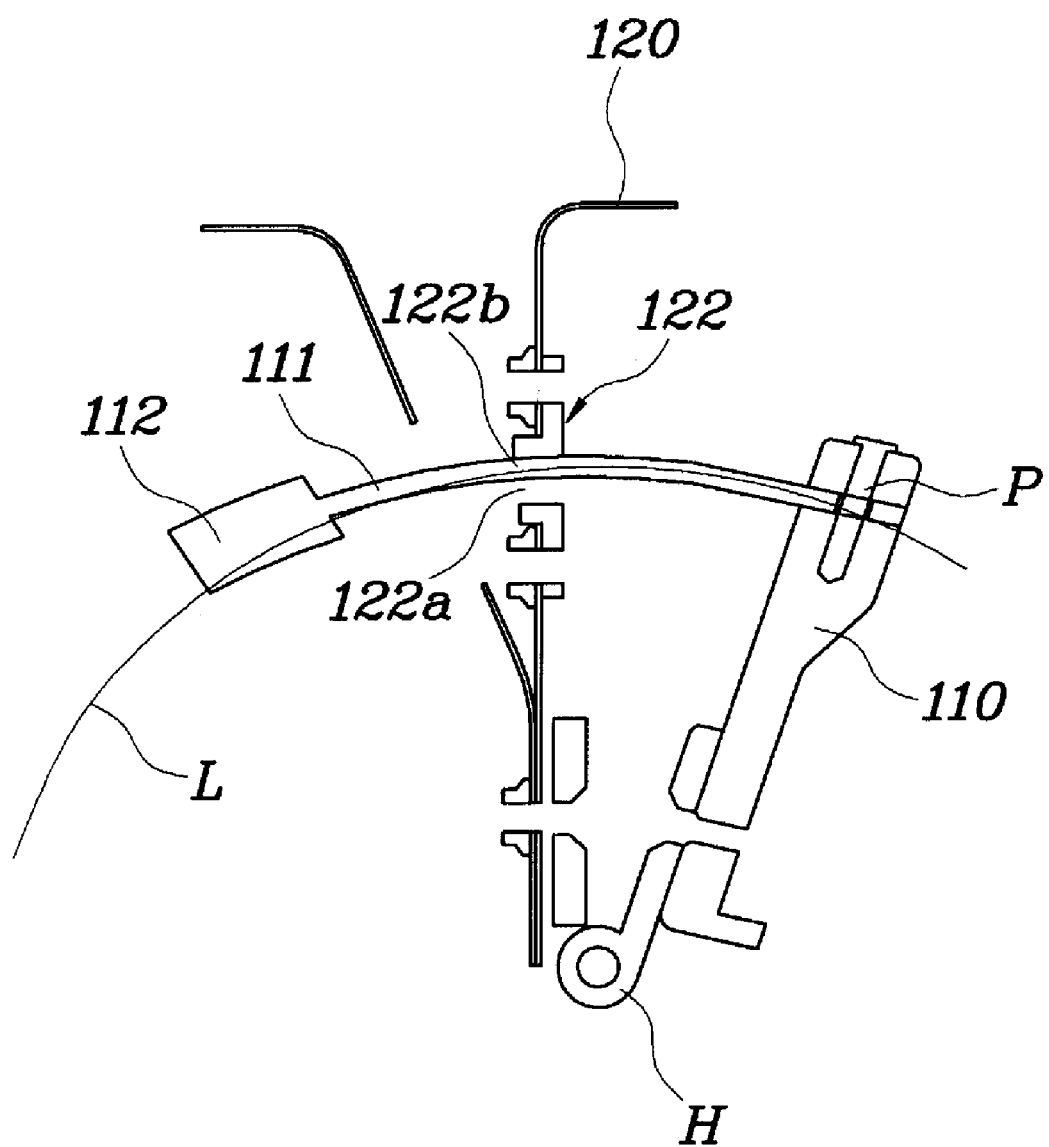
FIG. 16 is a view illustrating the state in which the first frame is being rotated downwards from the second frame.

Meanwhile, FIG. 16 is a view illustrating the state in which the first frame 110 is being rotated downwards from the second frame 120. Referring to FIG. 16, the guide bar 111 has the shape of an arc so that the guide bar 111 contacts the upper part 122b of the pad 122 when the first frame 110 is rotated. Here, the guide bar 111 is formed to have a curvature radius which is larger than a circular orbital pattern which has the hinge H at its center and contacts the upper part 122b of the pad 122.

Thus, when the first frame 110 is rotated, the guide bar 111 continuously presses the upper part 122b of the pad 122 and generates friction. Therefore, when the first frame 110 rotates downwards from the second frame 120, speed is continuously reduced by friction and smooth tilting is achieved.

Figure 17:
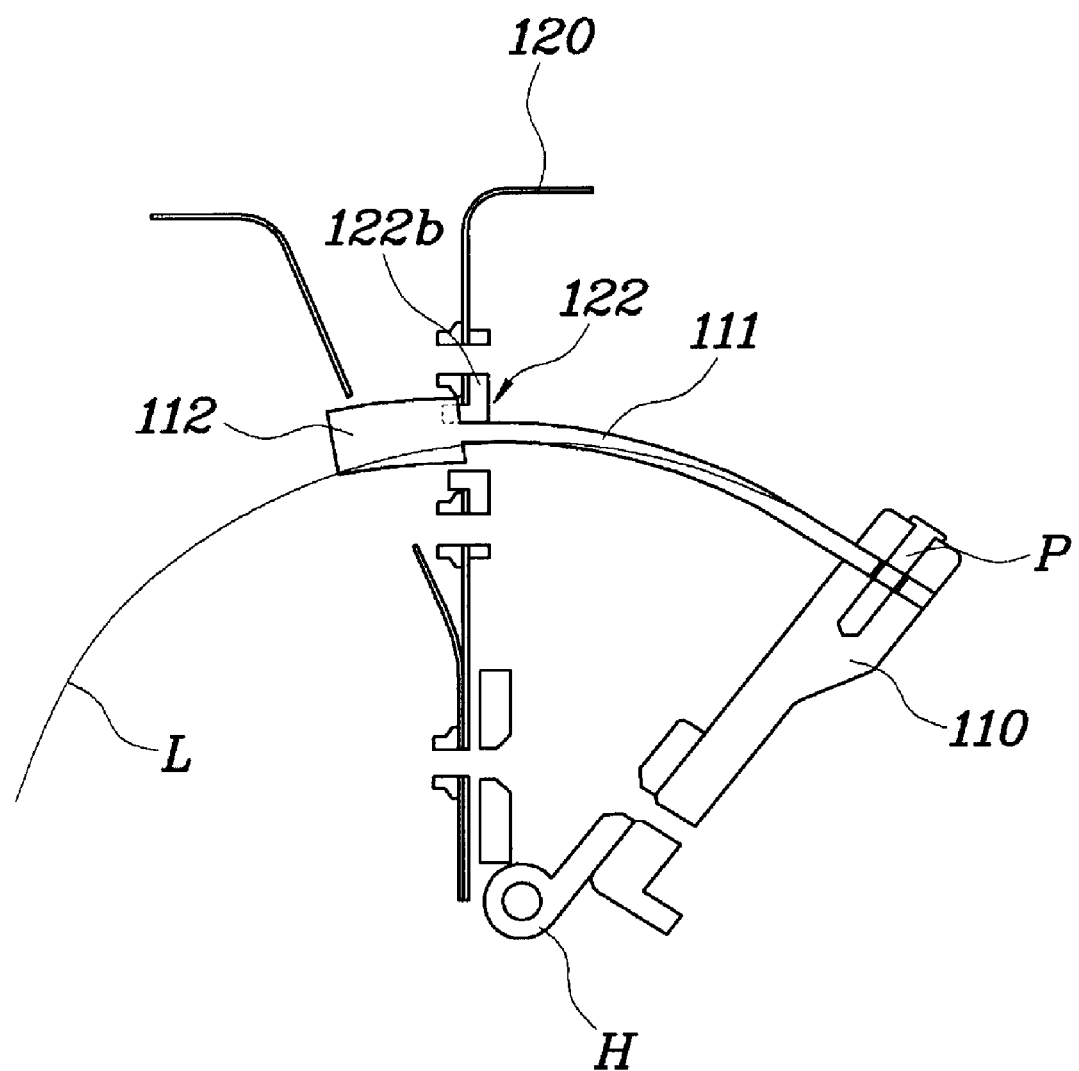
FIG. 17 is a view illustrating the state in which the first frame has been rotated downwards from the second frame.

FIG. 17 is a view illustrating the state in which the first frame 110 has been rotated downwards from the second frame 120. Referring to FIG. 17, the stopper 112 installed at the end of the guide bar 111 is stopped by the pad 122, so that the first frame 110 is rotated within a preset angular range and thereafter stopped.

Figure 18:
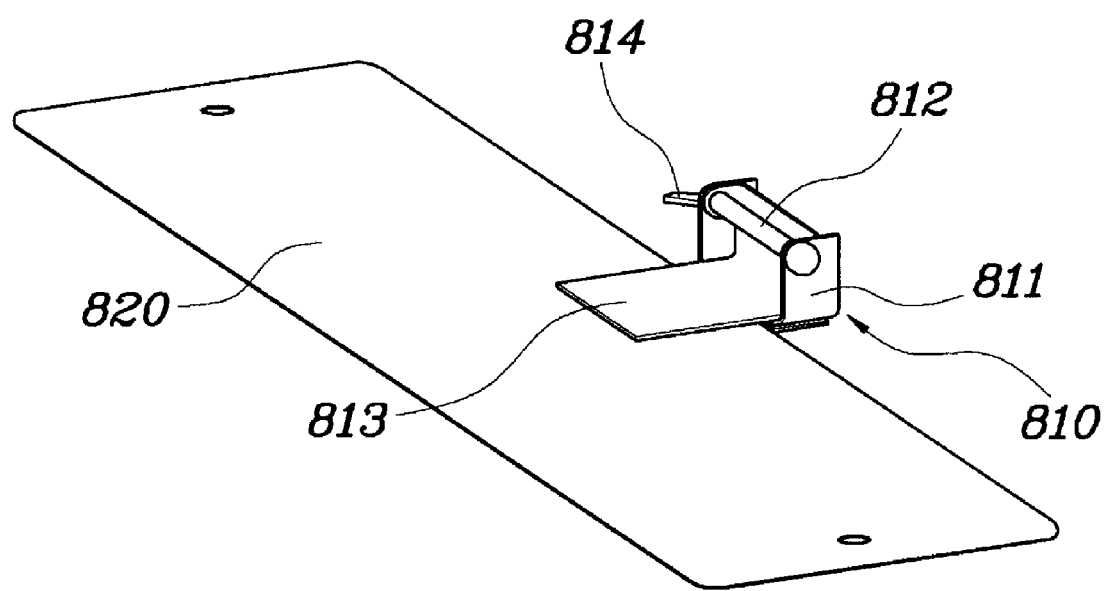
FIG. 18 is a view illustrating a subsidiary license plate mounting unit which is applied to the exemplary bicycle carrier according to the present invention.
Figure 19:
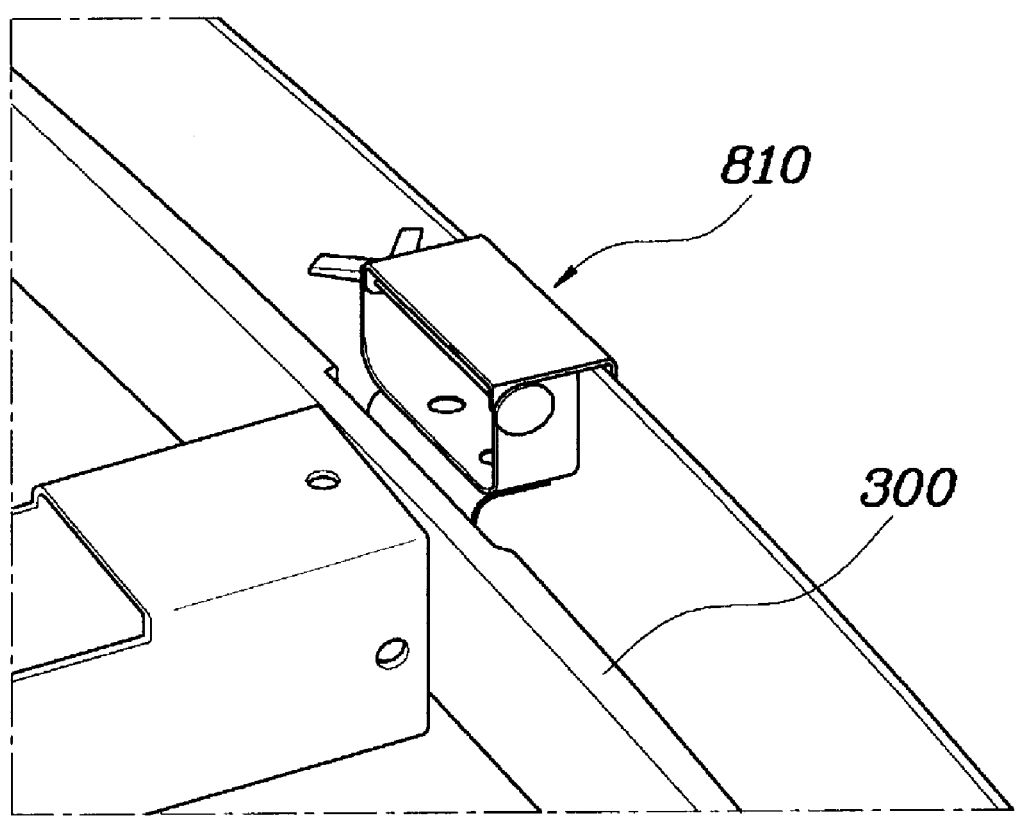
FIG. 19 is a view illustrating the state in which the subsidiary license plate mounting unit is installed to a rear frame.
Figure 20:
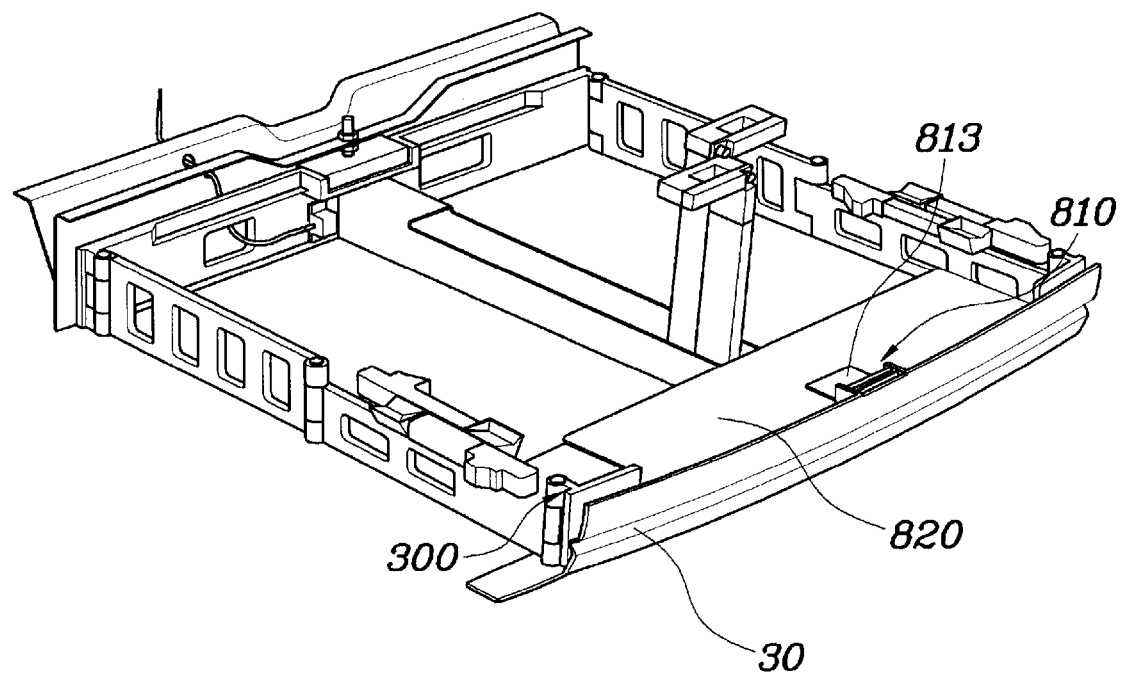
FIG. 20 is a view illustrating the state in which the subsidiary license plate mounting unit is positioned in an extensible bumper.

Meanwhile, referring to FIGS. 18 to 20, a subsidiary license plate mounting unit 800 may be installed to the rear frame 300 to attach a subsidiary license plate. The subsidiary license plate mounting unit 800 allows a vehicle plate number to be distinguished from behind the vehicle even when the bicycle is loaded onto the rear of the vehicle. The subsidiary license plate mounting unit 800 includes a license plate mount 820 to which a subsidiary license plate is attached, and a rotary clamp 810 which holds the license plate mount 820 in such a way that it is rotated in a perpendicular direction, thus allowing the license plate mount 820 to be positioned outside or inside the extensible bumper 30 installed to the rear frame 300.

Here, the rotary clamp 810 includes a support member 811 which is installed to the rear frame 300, a rotary pin 812 which is rotatably installed to the support member 811, and a fastening clip 813 which is secured to the rotary pin 812 to fasten the license plate mount 820.

Referring to FIGS. 1 and 20, when a user desires to house the bicycle carrier, the license plate mounting unit 800 is folded to the inside of the extensible bumper 30 and stored as shown in FIG. 20. Meanwhile, when a user desires to load the bicycle onto the bicycle carrier, as shown in FIG. 1, the license plate mount 820 is rotated, thus allowing the license plate mount 820 to be positioned outside the extensible bumper 30.

Thus, even when a bicycle is loaded onto the rear of the vehicle using the bicycle carrier according to the exemplary embodiment of the present invention, a vehicle plate number can be distinguished from behind the vehicle. This does not violate traffic regulations.

Figure 21:
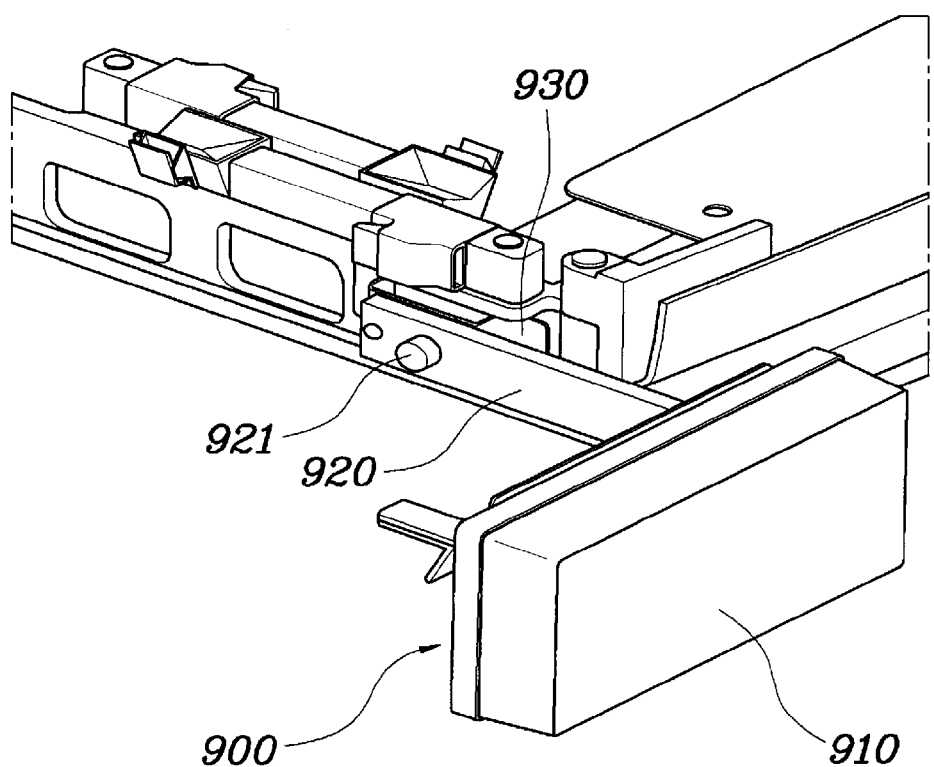
FIG. 21 is a view illustrating a subsidiary lamp unit applied to the exemplary bicycle carrier according to the present invention.
Figure 22:
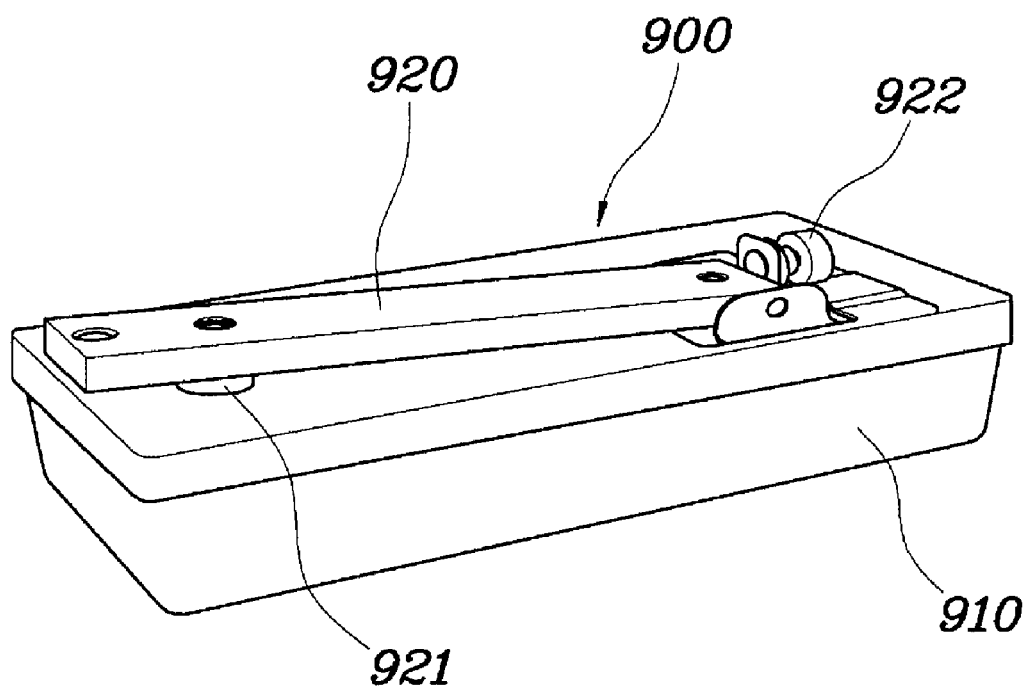
FIG. 22 is a view illustrating the folded state of the subsidiary lamp unit.
Figure 23:
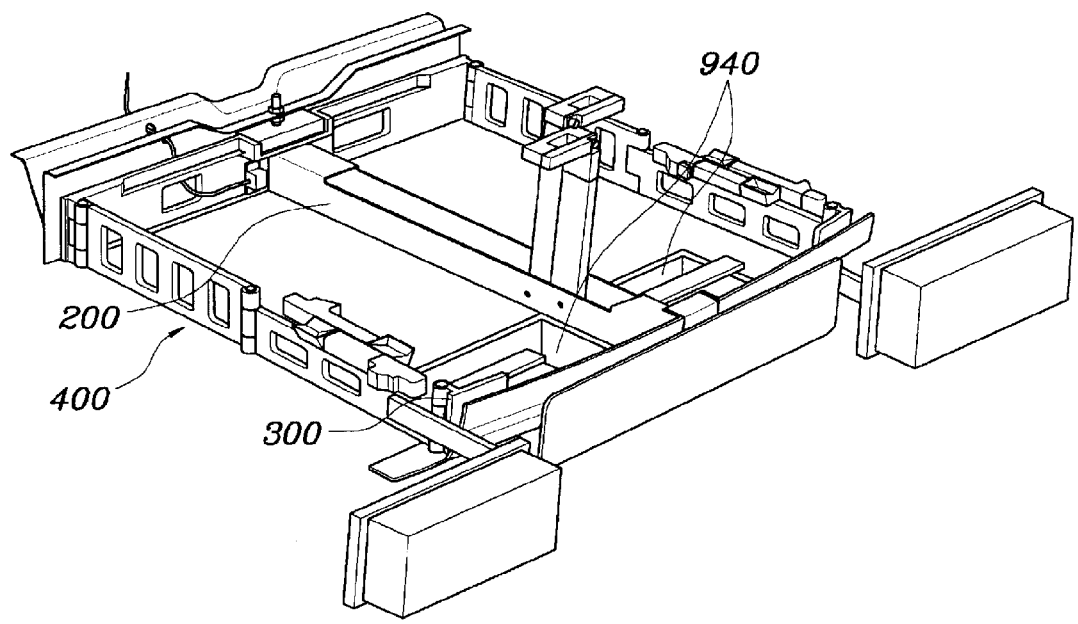
FIG. 23 is a view illustrating a lamp receiving unit applied to the exemplary bicycle carrier according to the present invention.

Meanwhile, referring to FIGS. 21 to 23, a subsidiary lamp unit 900 having the function of a subsidiary tail light may be installed to the folding unit 400. The subsidiary lamp unit 900 allows information displayed by the tail light of the vehicle to be unobstructedly transmitted to a trailing vehicle even when a bicycle is loaded onto the rear of the vehicle. The subsidiary lamp unit 900 includes a lamp body 910 and a coupling bar 920 which is coupled to the lamp body 910 to be fastened to the folding unit 400.

The coupling bar 920 is fastened to a coupling plate 930 installed to the folding unit 400 using a fastening bolt 921.

The lamp body 910 may be connected to an electric device of the vehicle to have the function of a turn signal lamp or an emergency light, or may be formed to have only the function of a reflecting lamp.

Meanwhile, the coupling bar 920 of the subsidiary lamp unit 900 is foldably connected to the lamp body 910, and is detachably connected to the folding unit 400. In the case of housing the bicycle carrier, as shown in FIG. 22, after the coupling bar 920 is detached from the folding unit 400, a fastening bolt 922 for fastening the coupling bar 920 to the lamp body 910 is loosened.

The subsidiary lamp unit 900 folded as such may be stored in the trunk of the vehicle. However, as shown in FIG. 23, it is preferable that the subsidiary lamp unit 900 be housed in the lamp receiving unit 940 which may be installed to the central frame 200. The lamp receiving unit 940 is preferably installed to be lower than the folding unit 400, thus preventing the lamp receiving unit 940 from interfering with the folding of the folding unit 400.

As described above, the present invention provides a bicycle carrier for a vehicle, in which the bicycle carrier is housed in a rear bumper to be concealed when a bicycle is not loaded, thus preventing the length of the vehicle from increasing when the bicycle is not loaded, and in which it is not necessary to frequently attach or detach the bicycle carrier to or from the vehicle, thus enhancing convenience.

Further, the present invention provides a bicycle carrier for a vehicle, which can be tilted downwards even when a bicycle is loaded onto the rear of the vehicle, thus allowing the trunk or tail gate of the vehicle to be opened even when the bicycle is loaded, therefore improving convenience, and which is provided with a subsidiary license plate mounting unit to allow a vehicle plate number to be distinguished from behind the vehicle, so that it does not violate traffic regulations, and which is provided with a subsidiary lamp unit, thus allowing information displayed by a tail light to be precisely transmitted to a trailing vehicle, therefore preventing vehicular accidents.

For convenience in explanation and accurate definition in the appended claims, the terms "upper", "lower", "downwards", "forward" and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bicycle carrier for a vehicle, comprising:
   a front frame placed in a forward direction of the vehicle and aligned along a transverse direction of the vehicle;
   a central frame aligned along a longitudinal direction of the vehicle and passing through the front frame;
   a rear frame placed in a rearward direction of the vehicle and secured to a rear end of the central frame;
   a folding unit disposed between the front frame and the rear frame and coupling each of opposite ends of the front frame with each of opposite ends of the rear frame, and selectively folded to vary a distance between the front frame and the rear frame;
   a bicycle wheel support pivotally provided on the folding unit, thus supporting a wheel of a bicycle loaded onto the bicycle carrier; and
   a bicycle body support pivotally provided on the central frame, thus supporting a body of the bicycle loaded onto the bicycle carrier.

2. The bicycle carrier as set forth in claim 1, wherein the central frame has a space therein and opens at an upper portion thereof so that the bicycle body support is rotatably received in the central frame to be housed therein.

3. The bicycle carrier as set forth in claim 1, wherein the front frame includes a first frame pivotally coupled to the folding unit in one rotational axis, one surface of a second frame being pivotally coupled to a lower portion of the first frame in another rotational axis, and another surface of the second frame being secured to the vehicle body, wherein the one rotational axis and the another rotational axis are perpendicular.

4. A bicycle carrier for a vehicle provided on the vehicle to load a bicycle to an outside of the vehicle, the bicycle carrier comprising:
   a front frame positioned in a rear bumper of the vehicle, and secured to a vehicle body;
   a central frame passing through the front frame and the vehicle body;
   a rear frame secured to a rear end of the central frame to be selectively drawn out of the rear bumper of the vehicle;
   a folding unit pivotally coupling each of opposite ends of the front frame with each of opposite ends of the rear frame, and selectively folded to vary a distance between the front frame and the rear frame while the rear frame moves;
   a bicycle wheel support pivotally coupled to the folding unit, thus supporting a wheel of the bicycle loaded onto the bicycle carrier; and
   a bicycle body support pivotally provided on the central frame, thus supporting a body of the bicycle loaded onto the bicycle carrier,
   wherein an extensible bumper is provided on the rear frame to form a part of an appearance of the rear bumper and be separated from the rear bumper when the rear frame is drawn out of the rear bumper, so that the central frame, the rear frame and the folding unit are housed in the rear bumper to be concealed, and are drawn out from the rear bumper when necessary.

5. The bicycle carrier as set forth in claim 4, wherein the central frame has a space therein and opens at an upper portion thereof so that the bicycle body support is rotatably received in the central frame to be housed therein.

6. The bicycle carrier as set forth in claim 4, wherein an elastic member is provided on a front end of the central frame, and a restraint unit is provided on the front frame so that the central frame is restrained by the restraint unit while pressing the elastic member, when the central frame, the rear frame and the folding unit are housed in the rear bumper of the vehicle.

7. The bicycle carrier as set forth in claim 6, wherein the restraint unit comprises:
   a housing provided on the front frame;
   a elastic member provided in the housing; and
   a restraining protrusion protruding to an outside of the housing by an elastic force of the elastic member and being selectively coupled to a hole of the central frame to restrain a movement of the central frame.

8. The bicycle carrier as set forth in claim 4, wherein a subsidiary license plate mounting unit is provided on the rear frame to attach a subsidiary license plate, and comprises:

a license plate mount to which the subsidiary license plate is attached thereon; and a rotary clamp holding the license plate mount so that the license plate mount is rotated with respect to the rear frame, thus allowing the license plate mount to be positioned outside or inside the extensible bumper.

9. The bicycle carrier as set forth in claim 8, wherein the rotary clamp comprises:

a support member secured to the rear frame;

a rotary pin rotatably provided on the support member; and a fastening clip secured to the rotary pin and to the license plate mount.

10. The bicycle carrier as set forth in claim 4, wherein a subsidiary lamp unit having a subsidiary tail light is provided on the folding unit, and comprises a lamp body and a coupling bar coupled to the lamp body to be fastened to the folding unit.

11. The bicycle carrier as set forth in claim 10, wherein the coupling bar is foldably coupled to the lamp body, and is detachably coupled to the folding unit.

12. The bicycle carrier as set forth in claim 11, wherein a lamp receiving unit is provided on the central frame so that the subsidiary lamp unit detached from the folding unit is folded and received in the lamp receiving unit, the lamp receiving unit being positioned to be lower than the folding unit and thus the lamp receiving unit does not interfere with folding operation of the folding unit.

13. The bicycle carrier as set forth in claim 4, wherein the front frame comprises a first frame pivotally coupled to the folding unit in one rotational axis, one surface of a second frame pivotally coupled to a lower portion of the first frame in the other rotational axis via a hinge, and the other surface of the second frame secured to the vehicle body, the first frame being rotatable downwards from the second frame within a predetermined angle, wherein the one rotational axis and the other rotational axis is perpendicular.

14. The bicycle carrier as set forth in claim 13, wherein an elastic member is provided on a front end of the central frame, and a restraint unit is provided on the first frame to restrain the central frame, so that the central frame is restrained by the restraint unit while pressing the elastic member, when the central frame, the rear frame and the folding unit are housed in the rear bumper of the vehicle.

15. The bicycle carrier as set forth in claim 13, wherein a pad having a guide hole is provided on the second frame, and a guide bar is provided on the first frame and is inserted into the guide hole to reduce a rotating speed of the first frame by friction occurring between the guide bar and the pad when the first frame is rotated.

16. The bicycle carrier as set forth in claim 15, wherein the guide bar has a shape of an arc so that the guide bar is in contact with an upper portion of the pad when the first frame is rotated, and is formed to have a curvature radius which is larger than a circular orbital pattern which has at a center of the hinge and contacts the upper portion of the pad, so that the guide bar continuously presses the upper portion of the pad and generates the friction when the first frame is rotated.

17. The bicycle carrier as set forth in claim 15, wherein a stopper is provided on a distal end of the guide bar to be stopped by the pad to limit a rotating angle of the first frame.

18. The bicycle carrier as set forth in claim 4, wherein the folding unit comprises at least a first link pivotally coupled to the front frame, and at least a second link pivotally coupled at a first end thereof to the at least a first link and pivotally coupled at a second end thereof to the rear frame, and wherein a link locking unit selectively locks the first link and the second link, thus preventing the folding unit from being unexpectedly folded.

19. The bicycle carrier as set forth in claim 18, wherein the link locking unit comprises:

a housing provided on the first link;

an elastic member provided in the housing; and a locking protrusion slidably coupled to the housing and elastically biased to an outside of the housing by the elastic member, wherein a locking hole is formed in a hinge formed in the first end of the second link so that a distal end of the locking protrusion is inserted into the locking hole when the first and second links are fully extended, and wherein the distal end of the locking protrusion is placed on a cam portion of the hinge when the first and second links are folded.

* * * * *